(12) United States Patent
Bateman et al.

(10) Patent No.: US 9,465,981 B2
(45) Date of Patent: Oct. 11, 2016

(54) SYSTEM AND METHOD FOR COMMUNICATION

(71) Applicants: Alec Bateman, Charlottesville, VA (US); Michael DeVore, Troy, VA (US)

(72) Inventors: Alec Bateman, Charlottesville, VA (US); Michael DeVore, Troy, VA (US)

(73) Assignee: BARRON ASSOCIATES, INC., Charlottesville, VA (US)

(*) Notice: Subject to any disclaimer, the term of this patent is extended or adjusted under 35 U.S.C. 154(b) by 0 days.

(21) Appl. No.: 14/707,755

(22) Filed: May 8, 2015

(65) Prior Publication Data

US 2015/0323989 A1 Nov. 12, 2015

Related U.S. Application Data

(60) Provisional application No. 61/991,035, filed on May 9, 2014.

(51) Int. Cl.
G09G 5/00 (2006.01)
G06K 9/00 (2006.01)
G06F 3/01 (2006.01)
G10L 13/02 (2013.01)
G06K 9/32 (2006.01)

(52) U.S. Cl.
CPC ........... G06K 9/00335 (2013.01); G06F 3/011 (2013.01); G06K 9/00248 (2013.01); G06K 9/00308 (2013.01); G06K 9/3233 (2013.01); G10L 13/02 (2013.01)

(58) Field of Classification Search
CPC ................................................. G06K 9/00335
USPC ........................................................ 345/156
See application file for complete search history.

(56) References Cited

U.S. PATENT DOCUMENTS 6,304,187 B1 10/2001 Pirim
6,575,902 B1 6/2003 Burton
6,885,818 B2 4/2005 Goldstein
7,035,432 B2 4/2006 Szuba (Continued)

FOREIGN PATENT DOCUMENTS

WO WO 02/082999 10/2002
WO WO 2014/110575 7/2014

OTHER PUBLICATIONS

Lalonde et al; Real-time eye blink detection with GPU-based SIFT tracking: 2007: pp. 1-7.

(Continued)

Primary Examiner — Jason Olson
(74) Attorney, Agent, or Firm — Williams Mullen, P.C.; M. Bruce Harper

(57) ABSTRACT

Computer based systems, methods, and computer readable media for sensing and decoding a sequence of facial expression exhibited by an individual sender, in order to determine a message encoded by that sequence of the individual. Digital image sensor devices may capture facial images of a sending individual. An enrollment processes is used by which an enrolled message is associated with a sequence of facial expressions. A background model is used with relevant expression models to locate a region of interest of the individual's face, which models accommodate the stand-off placement of the image sensors relative to the individual. An expression identifier is used with the expression model to classify captured images as including an enrolled facial expression. The classified images may then be decoded to identify the message sent.

20 Claims, 12 Drawing Sheets

(56) References Cited

U.S. PATENT DOCUMENTS

| | | |
|---|---|---|
| 7,091,471 B2 | 8/2006 | Wenstrand et al. |
| 7,676,063 B2 | 3/2010 | Cohen et al. |
| 7,916,897 B2 * | 3/2011 | Corcoran ............ G06K 9/00228 382/103 |
| 2012/0230553 A1 | 9/2012 | Chandra Bijalwan |
| 2014/0253429 A1 * | 9/2014 | Dai ........................ G06F 3/017 345/156 |
| 2014/0253876 A1 | 9/2014 | Klin et al. |

OTHER PUBLICATIONS

Chau et al: Real-time eye tracking and blink detection with USB Camras: 2005; pp. 1-10.

Pradeep et al; Eye controlled human machine interface; 2013: pp. 2205-2209.

Chinnawat et al; A Method for real-time eye blink detection and its application; 2009; pp. 1-6.

\* cited by examiner

SYSTEM AND METHOD FOR COMMUNICATION

CROSS REFERENCE TO RELATED APPLICATIONS

This application claims the benefit of U.S. Provisional Application No. 61/991,035, filed May 9, 2014, which is hereby incorporated in its entirety.

STATEMENT REGARDING FEDERALLY SPONSORED RESEARCH

This invention was made with U.S. Government support under Grant No. 1R43NR013853-01 awarded by the National Institutes of Health. The Government has certain rights in the invention.

FIELD OF THE INVENTION

The present disclosure relates to a system and method for communication. More particularly, the present approach includes a system and method employing facial expressions, such as blinking, as a basis of communication or encoding of messages.

BACKGROUND

The desirability of hands free interaction with and/or control of a system or device arises in many contexts. For many individuals, this often arises when the individual is performing a task that requires or benefits from the use of both hands. A common example is operating a vehicle, such as driving a car. But another example is a task in which the potential for contamination makes switching between the primary task and manual interaction with the electronic device undesirable, such as in performing surgery or food preparation. Voice commands are often used in such situations, for example, to control a smartphone while driving, or to control a surgical robot. Voice commands have significant limitations, including limited bandwidth, degraded performance in noisy environments, and in some applications or circumstances, a loss of privacy. In some applications, such as law enforcement or military, speech may disclose the presence of the speaker.

For individuals with physical impairments and/or amputations, it may be impossible to use one's hands to interact with a system. In such cases, hands free interaction is required. For example, individuals with amyotrophic lateral sclerosis (ALS) may have little or no voluntary control of their hands, feet, or limbs. Physical impairments may also prevent an individual from effectively issuing voice commands. An effective communication system that did not rely on one's hands or voice would be an effective means of input to an electronic device or system in all these cases.

The desire to interact with an electronic system when a visual display is not in view also arises in many of these contexts. For example, it may be unsafe to look at a visual display while operating various kinds of vehicles or machinery. For an individual who is in bed, it may be impractical or undesirable to keep a visual display in sight at all times. Audio rather than visual output from the system may be desirable in such contexts.

The ALS patient would be a very compelling beneficiary of such a system and method. Although the ALS patient population is modest in size, the disease is eventually completely debilitating and patients rely heavily on technology solutions for many needs including communication. Currently available systems provide some communication capabilities, but they generally have significant limitations in terms of physical intrusiveness and the need for frequent action on the part of a caregiver to keep the systems available to the patient.

Each year approximately 5,000 people in the U.S. are diagnosed with ALS. ALS is a progressive neurological disease that is invariably fatal. It is one of the most common neuromuscular diseases, and eventually leaves patients without the ability to control voluntary movements. Ultimately, it affects the diaphragm and other muscles in the chest, causing patients to lose the ability to breathe. The loss of breath support, combined with weakness in the palate, lips, and tongue, typically causes ALS patients to lose the ability to speak. It also leads to loss of the use of limbs, and even an inability to move the head, which, combined with loss of speech ability, make communication extremely difficult. ALS does not typically affect a patient's intellect; the combination of mental awareness and the inability to communicate is a very difficult aspect of the disease for many patients.

A number of Augmentative and Alternative Communication (AAC) systems have been developed to help ALS patients communicate. These include simple, low-tech solutions, such as communication boards that might include common phrases as well as a depiction of the alphabet, and that are typically navigated with the help of an assistant who points to the various options and watches for a signal from the patient to indicate a desired selection. Mechanical switches can also be configured to allow a patient to signal for assistance using any remaining control of limbs, head, or even eyebrows or cheeks. More technologically-advanced solutions are frequently based around a computer, and provide the patient with alternate input devices for interacting with the computer. Such devices include trackballs, joysticks, touchscreens, and head mice, with the choice of appropriate device depending on the degree of physical impairment.

In the late stages of ALS, nearly all voluntary muscle control can be lost, but oculomotor control is frequently retained. This makes eye tracking and blink detection systems the leading input modalities for these patients. The appropriate input device is typically combined with specialized software to facilitate communication. Such software can employ a variety of strategies, including efficient access to commonly-used phrases through menus or abbreviations, suggesting likely word completions to reduce the number of keystrokes that are required, and scanning through selections so that a patient can simply activate a binary switch at an appropriate time to select the desired option.

Despite the relatively wide range of available technology, important capability gaps exist. Systems utilizing visual displays, and particularly those using eye tracking, only function when the patient is positioned in front of them. It is not practical for a patient to always be positioned in front of the device, yet a patient needs the ability to communicate at all times. Various types of mechanical and non-contact switches can be used, but they rely on a caregiver to consistently place them every time a patient is moved, and such devices may also be physically intrusive. Particularly when a patient has gone to bed to sleep, providing them with a robust, persistent communication capability is challenging with existing technology. Effective communication devices are particularly important in this scenario because: (1) a caregiver will likely not be close at hand to recognize the patient's needs; and (2) night-time shifts are often staffed by less experienced personnel, who may have more difficulty inferring a patient's needs.

A number of devices have been proposed for the purposes of monitoring eye movements and detecting blinks. Many of these are wearable devices, because wearable devices provide a well-defined geometry of sensors, and in some cases illuminators, relative to the eyes. Wearable devices have certain drawbacks, including the potential for discomfort and inconvenience from having to wear a device, the potential for damage to the device when the user is moved, the need for either a tether to provide power or a battery on board the wearable device that must be recharged, and in healthcare applications, the need to rely on a caregiver to properly position and adjust the wearable device and to maintain the device (charging batteries, etc.)

A second class of devices that have been proposed, which may not be wearable, are designed to function with a user who is positioned or restricted within a fairly small range of allowable positions, and whose pose must comport to a fairly small range of allowable poses, typically directly facing the sensors with illuminators positioned in particular orientations with respect to be known pose of the user. Some efforts have attempted to address the need for robustness to pose variations, the range of poses to which such conventional devices is still limited and, because of reliance on the common use of hard cascades with sequential single stage criteria, may respond inappropriately to a captured image. A captured image of features including a region of interest may be rejected by the hard cascade, if it does not satisfy the single stage criteria. Images not including a region of interest that incidentally do meet the single stage criteria may be incorrectly accepted by a hard cascade. Conventional devices do not address the problem of determining whether or not an acceptable image of a facial region of interest is present in the field of view of any one of multiple imaging sensors covering a range of poses, and if so determining which subset of sensors provides the best information. Further, because such approaches have been directed to overcoming the challenges of increasing the range of poses, such approaches have narrowly addressed limited and prominent facial regions.

Existing approaches have commonly been closely proximate to the user, with the closest embodiments being wearable devices. As discussed, very close devices are intrusive and can obstruct or limit the poses of the user.

It would be desirable to implement a non-intrusive, stand-off assistive communication system having the capabilities for users to call for assistance and to communicate basic requests effectively using a sequence of facial expression.

In various other applications, it would be desirable to provide a system and method for facial expressions to control and input to an electronic device. Apart from assistive technology, such a system and method may find ready use by operators of vehicles, medical devices, head mounted computer systems, etc., to mention just a few of the many possible application areas.

SUMMARY

Embodiments of the present system and method are directed to providing a non-intrusive, high-reliability, high-availability, low-cost communication solution. The compelling need for ALS patients has guided initial prototype development for use in that application, but the present system and method should not be construed as to be so limited. Of course, different applications may drive different embodiments, as may be exploited by those of ordinary skill in the field. In general, the "user" or "sender" of a system may be the same person referred to interchangeably as an "operator" or, in some cases, a "patient." A "receiver" may be an individual person or device that might act on the message provided by the sender. In some cases, a receiver may be a healthcare professional or medical device. In other cases, by way of example, the receiver may be a receiving controller for heating and air conditioning.

Embodiments of the present approach may include computer based systems, computer implemented methods, and computer readable media having computer programming instructions to implement such methods using computer processors. The approach is suited to decoding a sequence of at least a first and a second facial expression exhibited by an individual sender, in order to determine a message encoded by that individual sender.

An enrollment processes is provided by which an enrolled message is associated with a sequence of facial expressions (nominally, at least a first and second facial expression). The facial expressions may be captured by a digital image sensor or camera. Upon receiving first and second enrollment digital images of first and second facial expressions of a sender in sequence, which includes a region of interest of that sender, one may form enrolled first and second facial expressions that are associated with that at least one enrolled message.

Optionally, the digital image sensing device may be an infrared sensor, but the approach is not so limited. The system or digital image sensing device may include a facial feature detector that locates a sender's face within an image, which can allow the system to detect changes of facial expression from a stand-off location without requiring the sender to wear a facial detection device. The facial feature detector can include a tracker that determines movement of the sender's face from sequences of images, using the background model and the first and second expression models described below.

The approach relies on several models for processing captured images: a background model, a first expression model, and a second expression model (i.e., in the nominal single sequence of two facial expressions.) The background model is adapted to characterize a plurality of pixels from at least a portion of an image of the sender's face outside a region of interest. The expression models are adapted to characterizing a plurality of pixels within an image of the region of interest of the sender's face when the sender is exhibiting the respective enrolled facial expression. The facial expressions need only demonstrate a desired sequence, and individual expressions may be repeated within a sequence. Similarly, a particular model for a facial expression may be used several times within a longer or more complicated sequence (e.g., eyes closed, eyes opened, eyes closed, eyes opened.)

As described in further detail below, the expression models characterize the plurality of pixels as a function of location (m, n), orientation ($\phi$, $\theta$, $\psi$), and size(s) of the region of interest within a captured image to accommodate variation in relative stand-off distance and orientation of the at least one digital imaging device to the sender.

The approach involves inter-relating at least one digital image sensing device with the background model and the relevant expression models to locate the facial region of interest of the sender and capturing images of the region of interest of the sender for the respective facial expressions. For a given image, the region of interest for a first expression model may be the set of pixels such that the score function is maximized when the first expression model is applied to those pixels and the background model is applied to all the other pixels. For that same image, the region of interest for a second expression model is the set of pixels such that the score function is maximized when the second expression model is applied to those pixels and the background model is applied to all other pixels. A third score function may be computed with the background model applied to all pixels. Whichever one of these three scores is larger may determine the region of interest (if applying the first or second expression mode gave a larger score) or that there is no region of interest (if applying only the background model gave a larger score). One may then apply an expression identifier to the captured images with the expression models to classify each of the captured images. In the example of a first and second facial expression, on might capture images and analyze them for exhibiting (i) the enrolled first facial expression, (ii) the enrolled second facial expression, or (iii) no enrolled facial expression. The classified first and second captured images may then be decoded with a sequence decoder based on a matching score, in order to determine if the classified first and second images satisfy a predetermined likelihood of communicating the at least one enrolled message.

In the ALS context, as noted above, oculomotor control may generally be retained even in advanced ALS, and this may provide one of the few means of communication consistently available to these patients. The present approach may initially be targeted at patients in bed, but it is contemplated that the system and method may be adapted for individuals otherwise disposed, such as someone seated in a bed, chair, or wheelchair. Initial embodiments of the system and method may have deployed a small number of infrared (IR) cameras with IR illuminators, processing capabilities to detect facial expressions, such as blink signals, and an alarm to signal or call for assistance or help. The output for initial embodiments may be audio rather than visual because speakers can be placed unobtrusively in the room, yet always be available. Embodiments of the system and method may be an "always-on" or "always-available" system that uses IR cameras to provide coverage of the patient whatever his or her positioning, such as lying in bed. The system may be low- or non-intrusive, with cameras mounted on ceilings or walls sensing patient inputs, and with no special markers or devices that a patient must wear or use. After the system has been installed, it will preferably not require that a caregiver take action to make the system or method available, other than placing the patient in bed or other posture. The system may use multiple cameras to provide coverage whether the patient is supine or lying on a side, and will use advanced signal processing techniques to detect blinks based on the video signals provided by cameras. The patient will need only to blink to call for help, or to navigate a simple menu structure to communicate common requests.

Embodiments of a system may run continuously and may include backup power, such as a battery, to ensure the highest possible degree of availability. Embodiments may use IR cameras and illumination, which is invisible to the human eye, to detect signals even in a darkened room. This is a useful aspect of the system, providing a robust means of signaling for assistance even in the middle of the night when a caregiver may not be close at hand. The system may take advantage of the physical characteristics of a specific patient (e.g., eye, nose, and mouth locations) to enhance its performance, and may leverage the rigorous statistical foundation from communication systems to develop optimal signaling sequences.

The present systems, methods, and computer readable media are directed to communication using facial expressions. A sequence of facial expressions may be used by a sender to encode messages. Enrollment of messages and associated facial expressions improve the ability of detecting such an encoded message subsequently.

Prototype embodiments of the present approach have permitted a user to communicate using only eye blinks as an input. An aspect is to provide persistent coverage of a frequently used location, such as a sleeping location. Infrared cameras may be positioned with a view of the selected location, and multiple cameras may be used to ensure coverage of a wide range of poses. After a system has been installed, it may readily be accessed by the user at any time from the target location. No intervention by a caregiver or user (e.g., positioning of a switch or tablet computer, re-calibration, etc.) is required when the user changes positions or postures. Embodiments of the system may provide two or more modes of interaction. In a virtual call-button mode, the system may sound an alarm for help when activated by the user. In a virtual communication-board (or VComm) mode, the system may allow the user to navigate a menu of common requests and communicate the selected request to a caregiver. The use of multiple unique blink signals is also possible. Unique signal codes may be used to trigger distinct behaviors in both the virtual call-button and VComm modes. The set of signals used in each mode can be overlapping or non-overlapping, and different signals may yield different specificity/sensitivity trade-offs.

The present approach eliminates many of the drawbacks of wearable devices by mounting all system hardware at a significant "stand-off" distance from the sender or user, and is designed specifically to provide excellent robustness to accommodate varying poses. This eliminates one of the major challenges in providing robustness to a wide range of poses of the person whose facial expressions are being tracked relative to the sensors and illuminators.

DETAILED DESCRIPTION

A. Introduction

Disclosed are embodiments of a real-time communication system in which a first-person or individual sender communicates messages by means of a sequence of facial expressions and the messages are received by a second person or device (sometimes, generically referred to as a receiver). Some description is on the basis of a particular prototype embodiment and operational testing; the Conclusion provides certain additional or more generic embodiments within the scope of the present approach.

In some embodiments, the system hardware may include one or more digital image sensing or capturing devices, such as infrared cameras (and optionally infrared illuminators). The digital image sensing devices may be considered to be configured or positioned in a "stand-off" manner from the individual sending the message, which may generally mean mounted at a distance (e.g., several feet) from an intended sender location and not worn by the sender (or used in association with other hardware affixed to or worn by the individual sender.) The stand-off configuration permits movement of the individual sender within the capturing frame of the at least one image sensing device. The image sensing devices may be connected in operable communication to a specially configured digital control unit with a computer processor and hosting real-time software to process the digital video stream with the sequence of facial expressions as provided herein. The digital control unit may be considered a logical structure, in that computer processing and supporting components, such as memory and non-volatile storage, may be distributed among various physical components.

Figure 1:
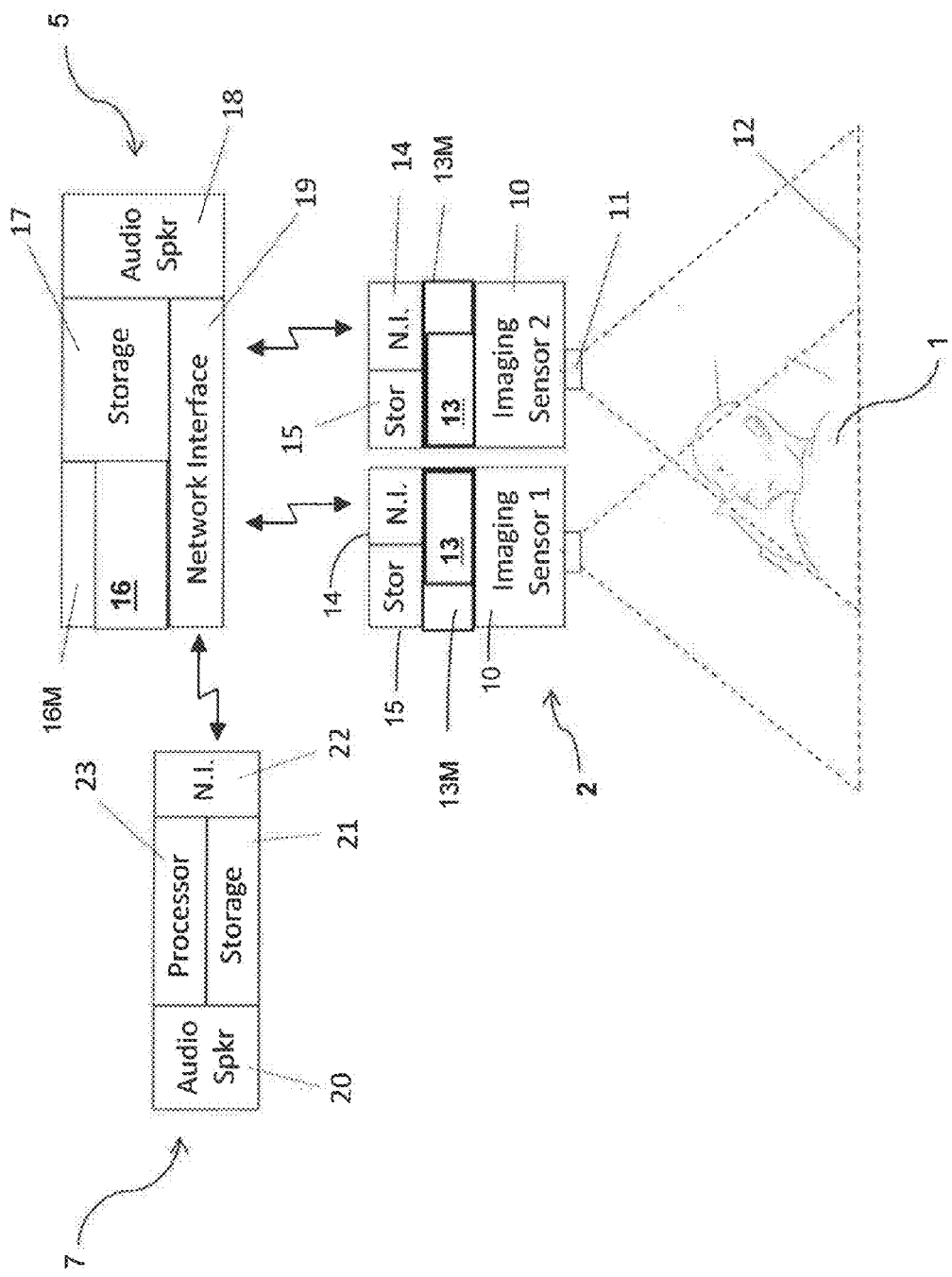
FIG. 1 is a schematic illustration of aspects of an embodiment of a prototype system enabling a sender to communicate messages by facial expressions.

Aspects of the system may include computer software or programming code that may also be organized or distributed among several components or organized into several stages. One prototype system embodiment is illustrated in FIG. 1. A first stage may reside within computer processing capability within digital image sensors 2. For example, a processor 13 of digital image sensors 2 may be associated operably with non-volatile sensor storage 15 (and memory 13M) such that programming code executed by sensor processor 13 may conduct pre-processing on data received through lens 11 from sensors 10, such as extracting image regions, encoding images into still images, or video stream formats. A second stage may interface with digital image sensors 2, read images over an appropriate buses (14, 19), and convert raw data stream into a data structure appropriate for the downstream image-processing algorithms. The resulting video data may be used by software, such as two separate prototype software components. One component may support user or individual sender 1 enrollment, which is a process by which information regarding the appearance or facial expressions of a specific sender 1 may be encoded, so that system performance might be optimized for that person. The enrollment may be a semi-automated procedure in which the system identifies or receives digital images of first and second facial expressions in sequence within a region of interest (e.g., open- and closed-eye images of a person's face), and the system installer may verify the candidate images and ensure that they encompass the desired range of conditions, including varying user poses. A sequence of enrolled first and second facial expressions may generally be associated with an enrolled message. The enrollment process is generally performed at least once, when a system is initially configured for the sender or user.

Figure 4:
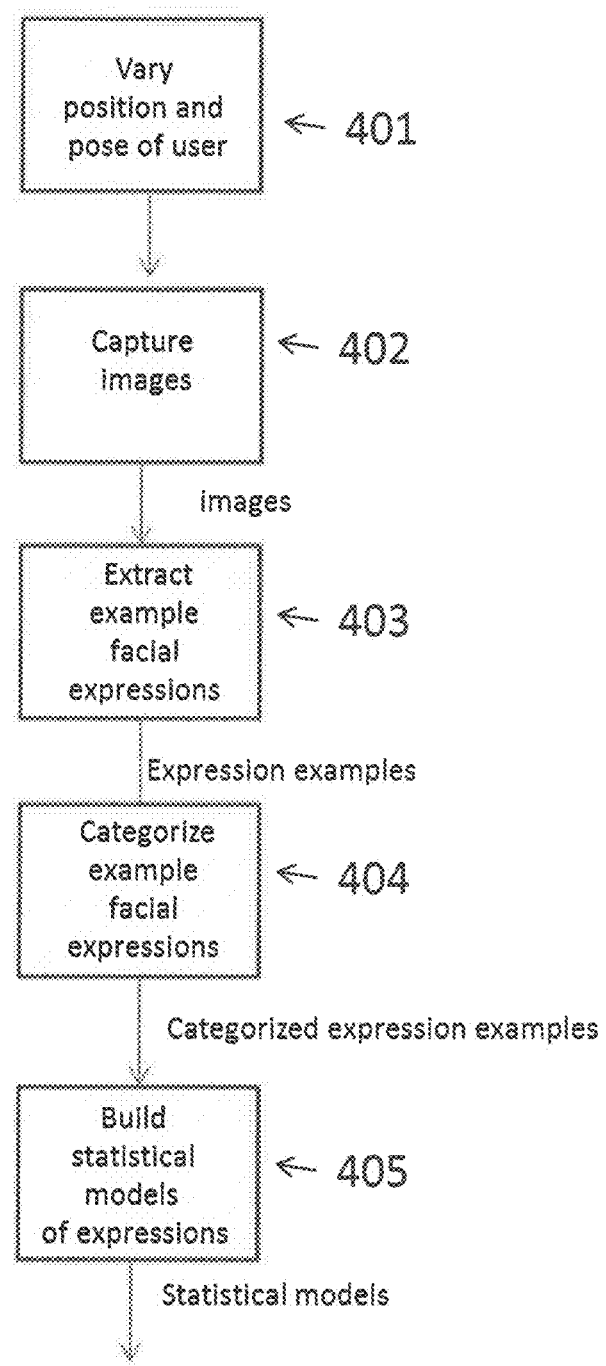
FIG. 4 illustrates an example of enrollment of a user.

An embodiment of a method for enrollment is illustrated in FIG. 4. As shown, In this figure, the person who is installing and configuring the system moves the image sensing devices and/or the using sender of the system so that images of the sender encompasses the range of positions and poses of the sender relative to the image sensing device that will be encountered during operation 401. The image sensing devices capture or receive a sequence of enrollment digital images encompassing various poses and positions 402. These images are transmitted to enrollment software, such that the digital control unit 5 receives the enrollment digital images from the sensing device 2 (as shown in FIG. 1). The enrollment software extracts images of candidate facial expressions, a process that may be guided by a human installer in step 403 and classifies the images into different facial expression categories, a process that may also be guided by the human installer 404. The enrollment software may then build statistical models of each category of enrolled facial expression 405 (i.e., a background model and facial expression models), in association with an enrolled message. These models may then be used by the system in real time operation.

Figure 2:
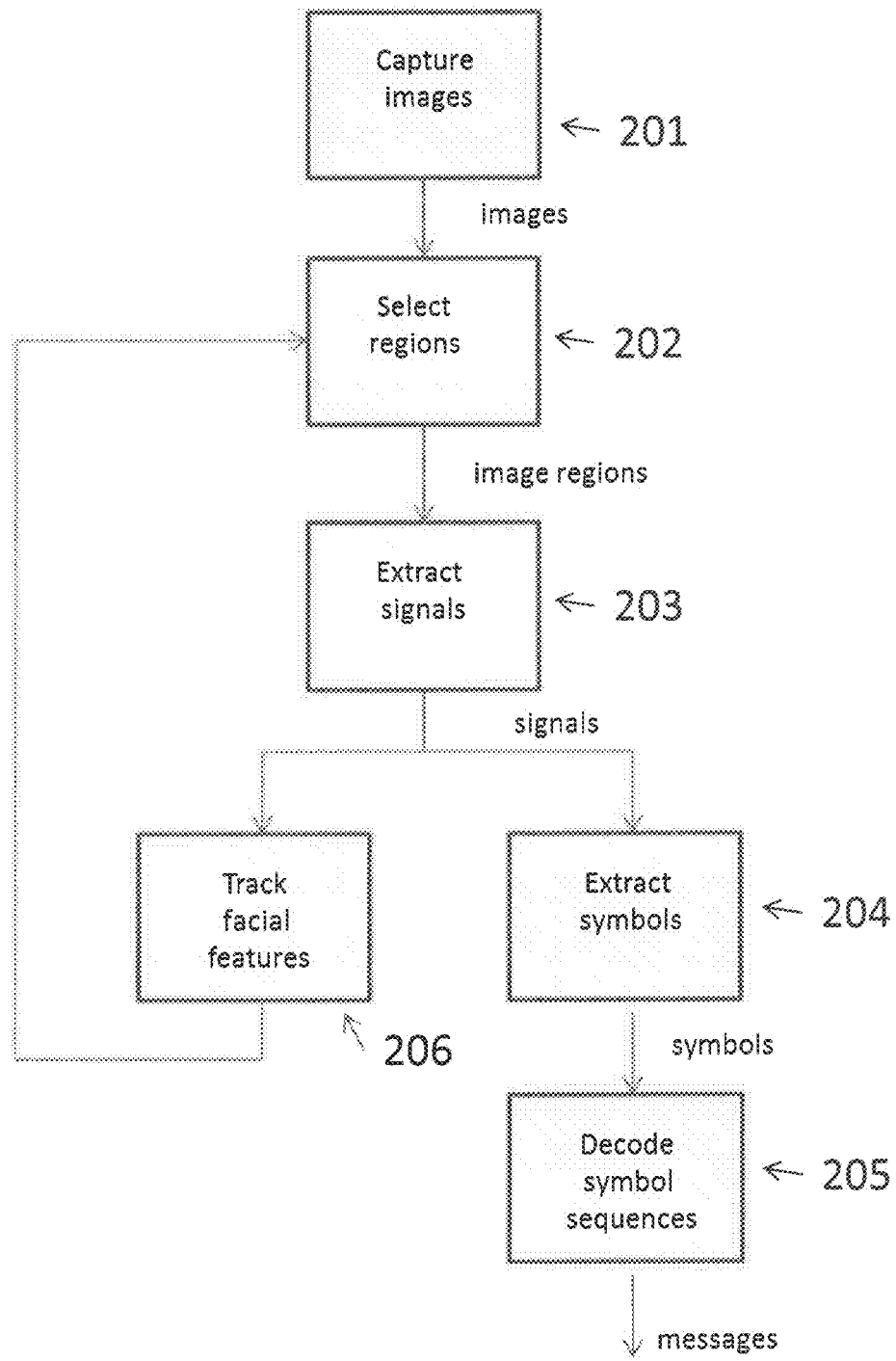
FIG. 2 is a detail of a portion or aspects of method embodiments.

Another component that processes video data is the real-time facial expression detection system, which first selects relevant image regions in the video images 202, as shown in FIG. 2. This may initially be done by scanning a full image frame (e.g., frame 12 of FIG. 1), and the scanning of full images may be repeated periodically during operation of the system. After image regions that represent facial features have been identified, the location of the facial features may be tracked through a separate process that examines local areas of the image region near the location identified in previous frames 206. After image regions of interest have been selected (e.g., typically facial regions of the sender), the system assesses the likelihood that these image regions represent the various facial expressions the system is designed to recognize 203. This process may be considered a form of signal extraction, and a signal is a vector valued quantity that represents for each expression the likelihood that an image region represents that facial expression. The signals generated by the system 203 may include one or more sets corresponding to one or more image regions of interest. From the signals, the system next extracts a sequence of symbols 204 where a symbol may represent a particular expression that is maintained for a specified period of time or another feature of the signal. The system next decodes sequences of symbols to extract messages 205.

Figure 9:
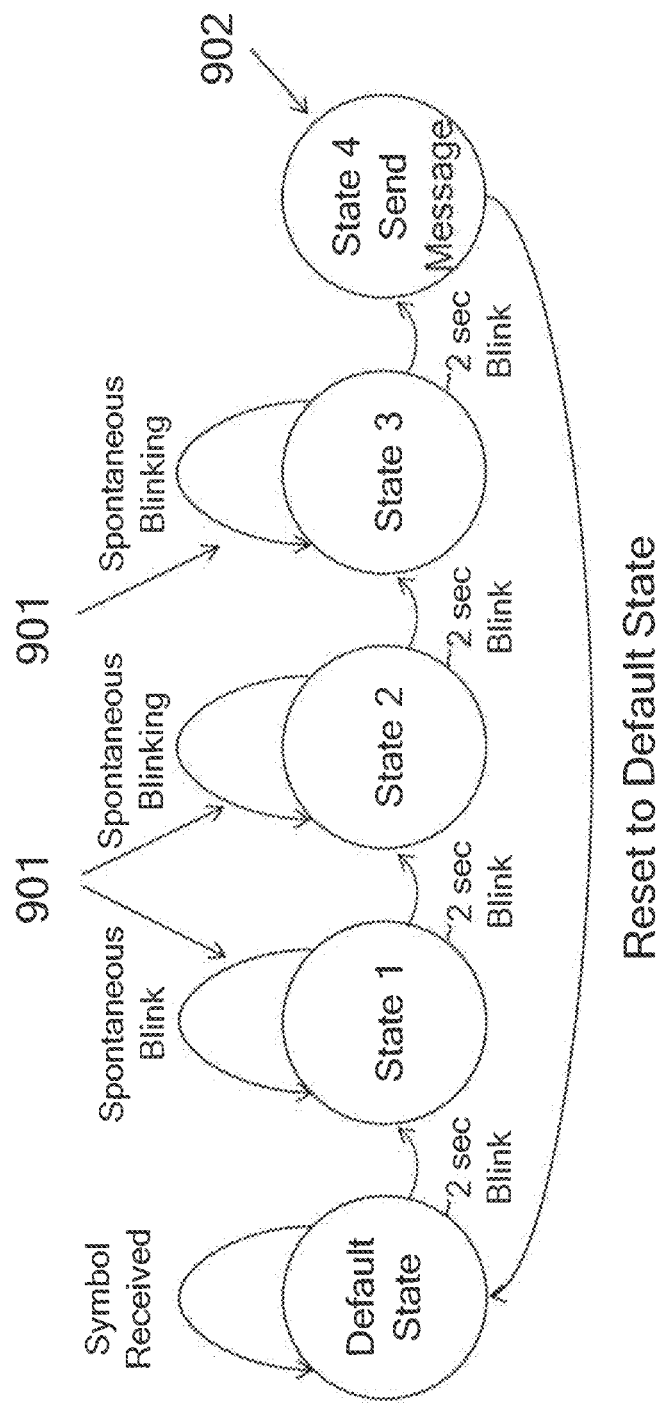
FIG. 9 illustrates a decoding step.

FIG. 9 shows an embodiment of a decoding stage or step 205. In this embodiment, an eye closure (blink) may be a single sequence of facial expression that is used to communicate, and a blink with duration of approximately two seconds may be a symbol in a communication alphabet. When four symbols representing a blink of approximately two seconds are detected in a row, the system may send a message to downstream components. In one embodiment, a Hidden Markov Model has been used to represent the available state transitions within a sequence and likelihoods in the decoder, and a Viterbi decoder algorithm has been used to estimate the maximum likelihood state sequence. Transition probabilities in the hidden Markov model may be adjusted to control the number of spontaneous planks that can be interspersed among the symbols in the message 901. In one embodiment, the message 902 causes activation of a virtual call button to signal for medical assistance.

Messages from the system decoding of symbol sequences 205 (FIG. 2) can be used for a wide variety of purposes.

Messages may be communicated to a second person, or to a device. When messages are communicated to a second person, this may be done through audio speaker 18, visual or other interfaces on the digital control unit 5, or alternately through a handheld unit 7 that may also contain an audio speaker 20, or visual, tactile or other interfaces. The system may recognize one or more distinct messages, and the messages that are recognized may vary depending on the mode of operation of the system. Various methods for selecting symbol sequences that constitute or are associated with messages and for selecting decoding algorithms may be available. These choices will affect the communications rate, and capabilities for detecting and correcting errors, for example.

Figure 3:
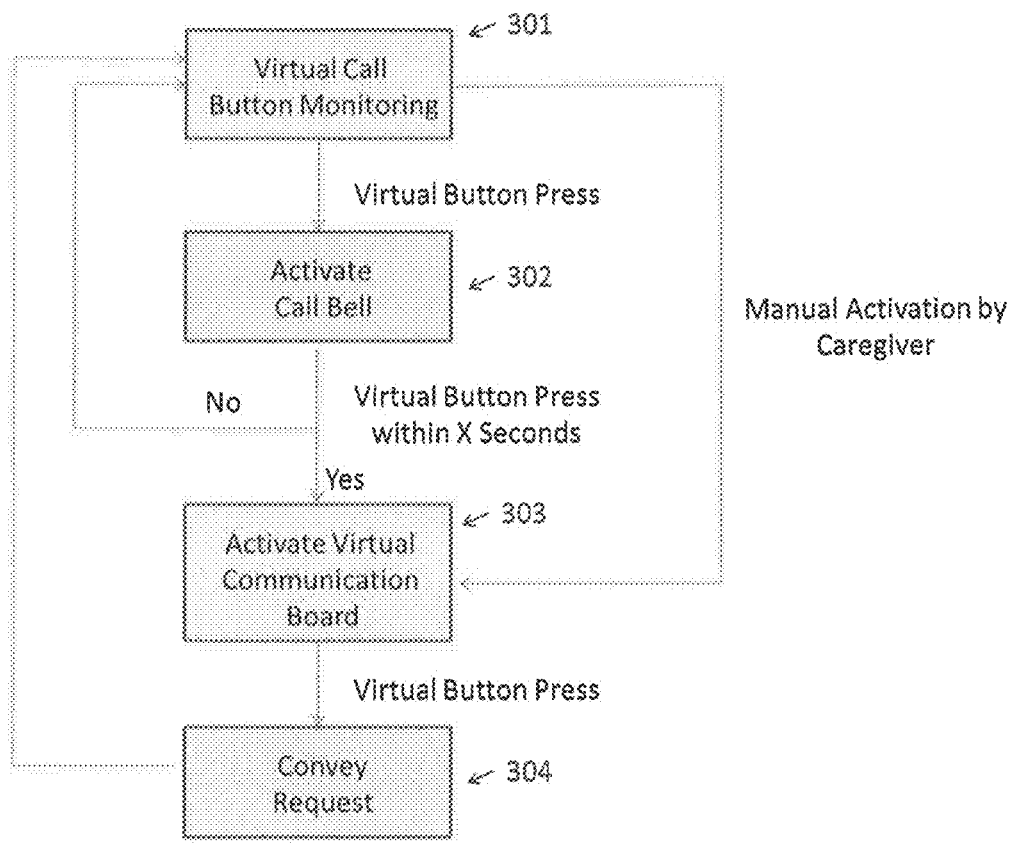
FIG. 3 shows an embodiment of a virtual call-button/virtual communication-board mode management.

In one embodiment illustrated in FIG. 3, the system may be used by a person (sender) who is severely impaired physically to summon medical help or to communicate specific requests to a caregiver or other receiver. In this embodiment, the system may be configured to detect only a single message, which is also referred to as a "virtual button press". When a virtual button press is received once, it may activate a call bell 302 to summon a caregiver to provide medical assistance, for example. When two virtual button presses are received within a specified duration of time, a "virtual communication board" system may optionally be activated 303. Activation of the virtual communication board system may or may not result in cancellation of the initial caregiver summons. A third virtual button press may be used to select an item from the virtual communication board menu to convey a request 304, at which point the system may return to a default call button monitoring state 301. In this embodiment, communication symbols and messages are designed to achieve very high sensitivity and specificity in the call bell functionality.

Figure 5:
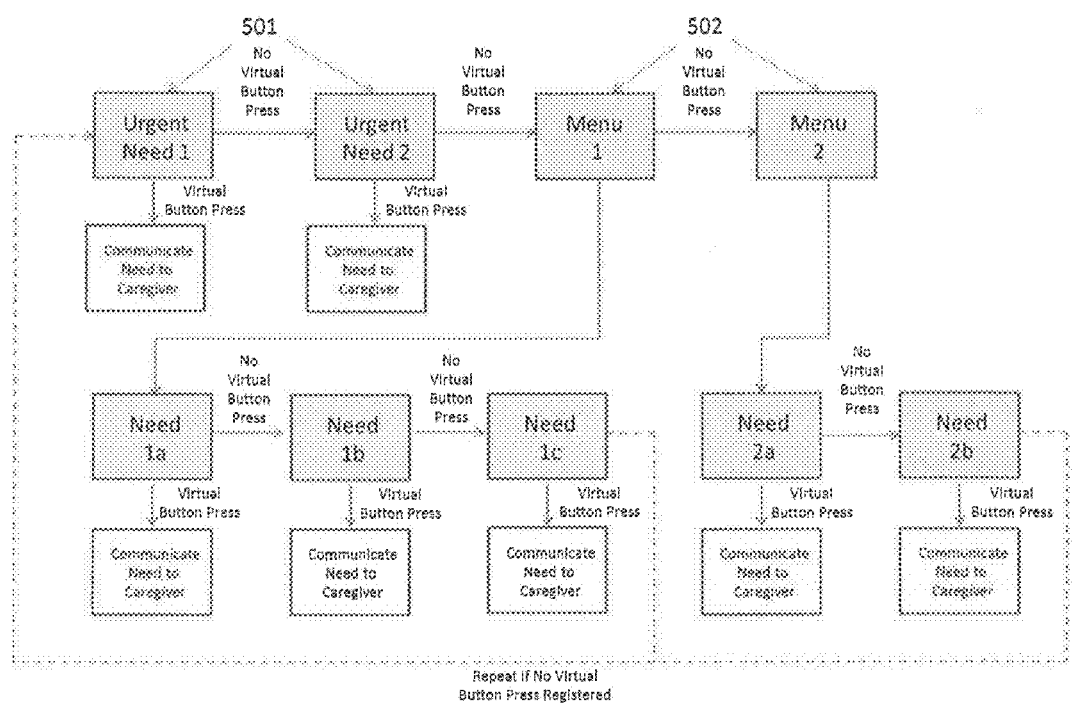
FIG. 5 is a flow chart of a virtual communication board.

In one virtual communication board embodiment illustrated in FIG. 5, the virtual communication board may be organized in a hierarchical structure that allows urgent needs to be specified most quickly and lower priority or less urgent requests may take longer to access through the menu structure. In the example embodiment, urgent needs 1 and 2 are the first items 501 on the communication board logically presented to the sender. Lower priority items may be organized within logical submenus 502, which could include categories such as requests for repositioning, or environmental controls. Requests for environmental controls, for example, may optionally be communicated to a second person or receiver, or may directly interface with a device in the environment (e.g., to turn lights on or off) as a receiver. The menu items on the virtual communications board may be communicated to the sender through a variety of mechanisms including audio and visual displays. In one embodiment, audio displays are used exclusively to eliminate the need for a visual display to be placed within the field of view of the sender. An audio announcement of each menu item may be made, followed by a pause that provides adequate time for the sender to communicate a message through a sequence of facial expressions that correspond to enrolled facial expressions for a desired enrolled message.

B. Principles of Operation

Figure 6:
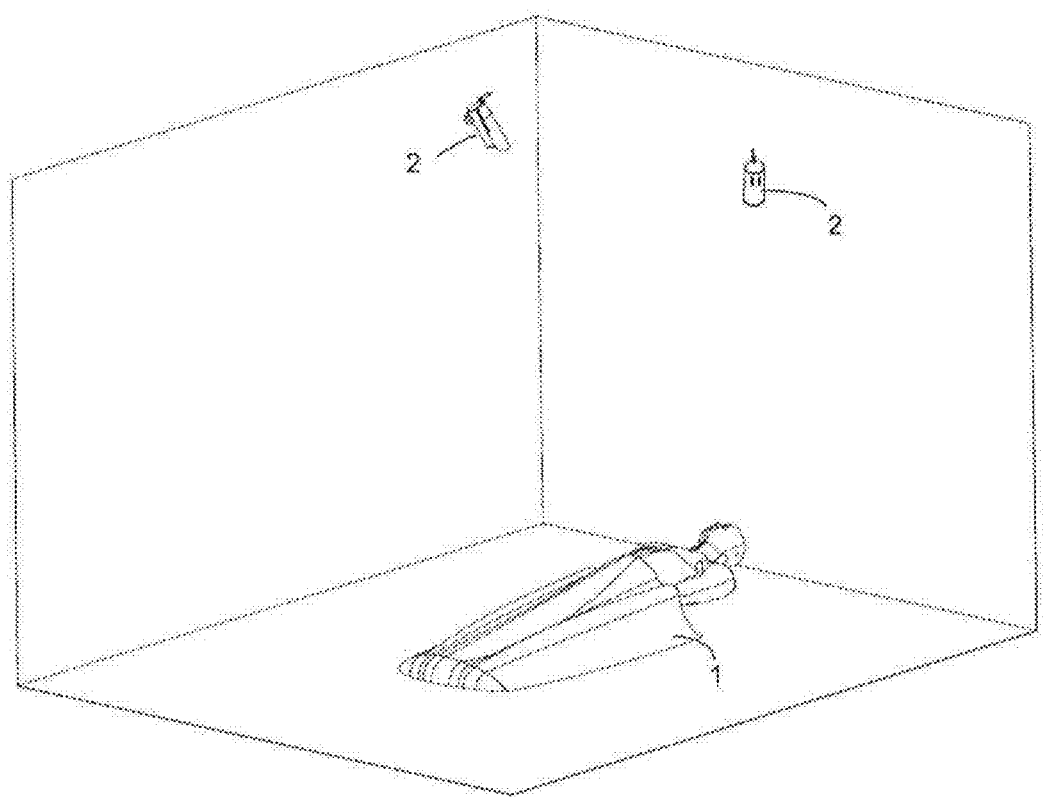
FIG. 6 illustrates sample stand-off placement of image sensors.
Figure 7:
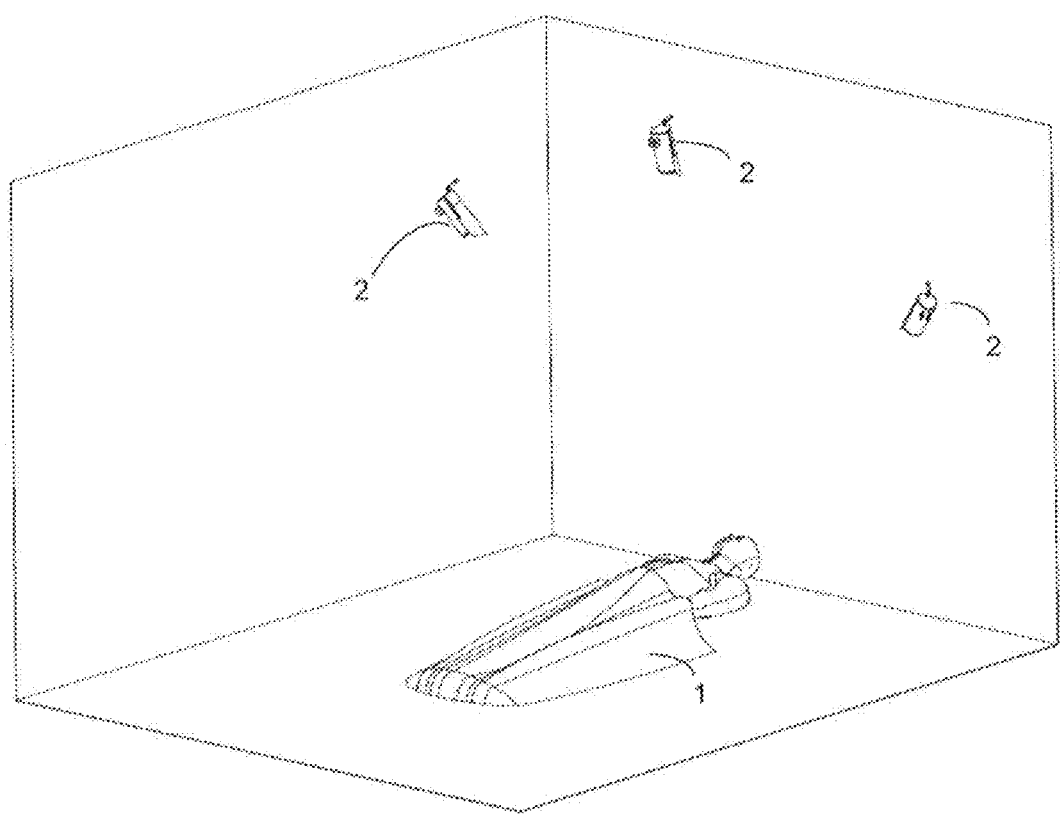
FIG. 7 illustrates sample stand-off placement of three image sensors
Figure 8:
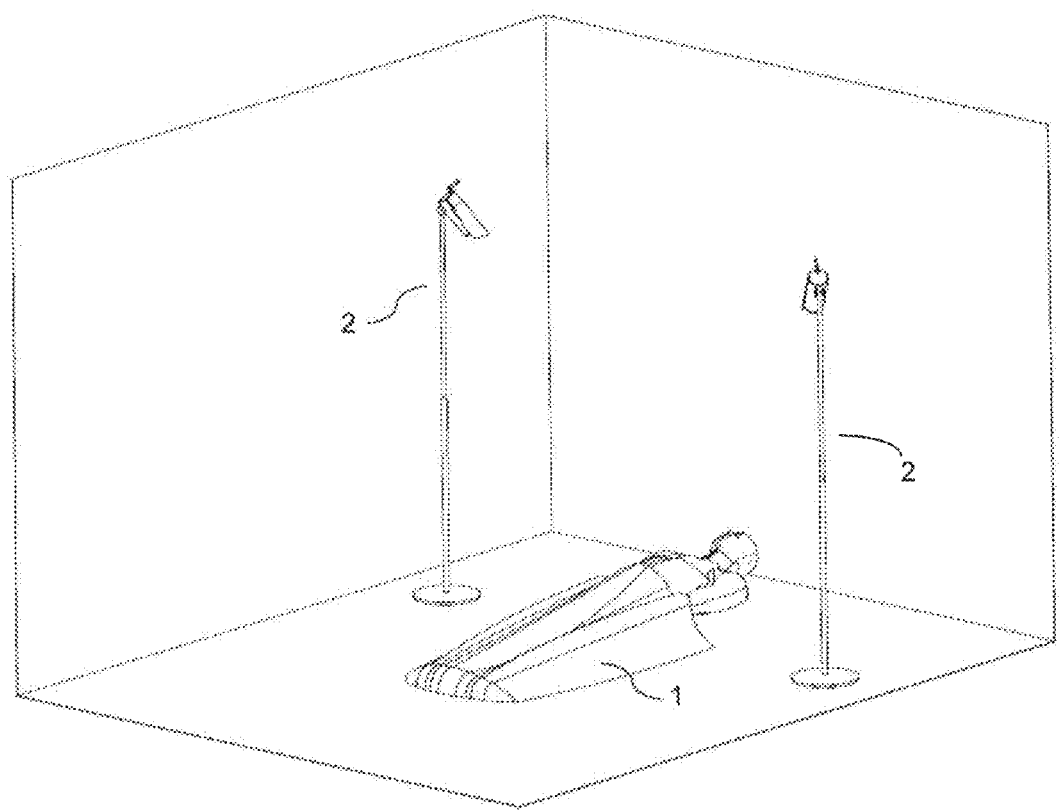
FIG. 8 illustrates a sample stand-off placement of two image sensors mounted on movable stands.

In some embodiments of the system, digital sensing devices 2 may comprise infrared illuminators paired with infrared cameras such that the illumination is directed primarily along the line of sight of the camera. In one embodiment of the system, two camera/illuminator pairs may be located in a plane that is parallel to the headboard of the sender's bed at a stand-off of about the sender's waist (i.e., the plane passing approximately through the using sender's waist.) In this embodiment, digital image devices 2 may be mounted on room walls or the ceiling on opposite sides of the sender 1 such that they are pointed down in approximately a 45° angle (see, e.g., FIG. 6). In a second embodiment of the system, three camera/illuminator pairs may be located in a plane parallel to the headboard of the sender's bed and passing approximately through the sender's waist. In this embodiment, digital image devices 2 may be mounted on the walls or the ceiling such that image device 2 is directly over the sender 1 and pointed down, and the other two image devices 2 are on opposite sides of the sender 1 and pointed down at approximately a 30° angle (see, e.g., FIG. 7). In a third embodiment, digital image devices 2 may be mounted on stands, rather than being permanently affixed to walls or ceilings (see, e.g., FIG. 8). Additional configurations are possible, in that the present approach is able to accommodate considerable variation in relative stand-off orientation of these at least one digital image devices 2 to the sender 1, including configurations in which one or more digital image devices 2 are positioned to provide favorable viewing angles when the using sender 1 is sitting upright rather than lying flat.

In embodiments using infrared cameras to serve as the at least one digital image device 2, illuminators may be physically integrated with the cameras, such as a ring of infrared light-emitting diodes (LEDs) disposed around the lens. The prototype system includes a computer processor configured to read data from the cameras, execute the blink detection and decoding methods or steps, and to play audio signals. Other operations or methods may be included and/or employed. For example it is contemplated that some embodiments may include options for additional caregiver interface devices, such as interaction (e.g., calling or messaging) with mobile electronic devices (smartphones, tablet computers, etc.).

C. Aspects of Processing Methods

Embodiments may include methods or algorithms to: (1) locate the facial region(s) of interest in an initial frame of a video stream; (2) track any movement of these region(s) between successive frames of the video stream; and (3) classify the facial expressions in each frame. These algorithms may account for six degrees of freedom of a patient's motion relative to the camera (translation up/down, left/right, and forward/backward; and three rotational degrees of freedom), as well as for changes in lighting brightness and contrast. Although the computational form may be identical for each patient, the algorithms may employ patterns characterizing facial expressions that are customized for each individual. Those patterns may be learned from a short segment of video in which the patient demonstrates various expressions to form enrolled first and second facial expressions for association with an enrolled message, a process referred to as enrollment. Implementation of these algorithms were shown to be both highly accurate and capable of running in real time while processing video at about 15 frames per second (fps), for example.

The approach to facial expression classification may be based on approaches including, but not limited to, maximum-likelihood estimation, Bayesian decision rules, minimum-mean-squared error estimation, or minimum-mean-absolute error estimation. Each pixel in an image of a facial region may be modeled as an observation of a Gaussian random variable whose statistics (mean, variance) are functions of multiple parameters, including the row and column locations of a feature within the image (denoted by $j$ and $k$, respectively), the expression state (e.g., if an eyelid state, a percent closed, denoted by $q$), the facial expression's size in the frame (distance/zoom setting, denoted by s), as well as the average image brightness (b) and contrast (c) and the angular orientation (represented by three angles denoted $\phi$, $\theta$, $\psi$). These pixel values may be modeled as: (1) conditionally independent from each other, given the values of these parameters; and (2) independent of the face's vertical and horizontal position in the image (m and n, respectively). Pixels in a video frame that are not part of a facial region of interest may be modeled as uniformly distributed over the range of possible pixel values ([0; 255]).

A prototype embodiment of the system represents the likelihood that an image of a facial region appears in a given video frame at location (m; n) with parameters (q; s; b; c) as a product over all pixels in the frame as:

$$L(m, n, q, s, b, c) = \left[\prod_{j=1}^{J(s)} \prod_{k=1}^{K(s)} f(y_{m+j, n+k}; \mu(j, k, q, s) + b, c\sigma^2(j, k, q, s))\right] \left[\prod_{j=J(s)+1}^{M} \prod_{k=K(s)+1}^{N} \frac{1}{256}\right]$$ (Equation (1))

The first bracketed expression is a product over the J rows and K columns of the hypothesized eye image, and the function $f(\bullet; \nu, \xi^2)$ is the probability density function (PDF) for a Gaussian random variable with mean $\nu$ and variance $\xi^2$. Here, image brightness is modeled as an additive bias on all J×K pixel values, and contrast is modeled as a multiplicative scale factor on the variance of all pixel values. The second bracketed expression is a product over all pixels in the video frame that do not correspond to the facial region of interest (e.g., pixels from other regions of the face, hair, or background objects), and the quantity 1/256 is the PDF of a uniformly distributed random variable. The prototype embodiment can be readily extended to include rotational degrees of freedom.

The functions $\mu$ and $\sigma^2$ characterize the mean and variance statistics, pixel-by-pixel, of a patient's facial region under nominal lighting conditions as a function of facial expression state and image size. These functions may be learned (i.e., estimated) for each patient by collecting a short video clip containing multiple images of the facial region in various expression states. Based on these images, rectangular regions containing the images of the facial regions of interest may be manually selected and annotated as with the appropriate facial expression (e.g., an eyelid opened/closed) by the system operator. Mean and variance statistics are then estimated directly from the pixel values within the selected regions. There is no need to carefully control lighting conditions for these patient enrollment videos, because $\mu$ and $\sigma$ are adapted to arbitrary lighting conditions via the bias and scale parameters, b and c. Moreover, in practice it is not necessary to collect video clips with the face appearing at various sizes, because simple geometrical scaling can be used to approximate the effects of changing face sizes in an image. Similarly, it is not necessary to collect video clips with the face appearing at various rotations around the camera's optical axis, because image rotation can be used to approximate the effects of such physical rotations. Rotations of the face around axes other than the camera's optical axis may be approximated by geometric transformation of the image or may be directly collected as part of the video clip.

A prototype embodiment of the system formulates methods or algorithms for locating, tracking, and determining the expression states of the face as a search for the combination of parameters that maximize the likelihood function in Equation (1). For example, the expression state in an arbitrary frame is determined to be $\hat{q}$, where:

$$\hat{q} = \underset{q \in \{opened, closed\}}{\operatorname{argmax}} \max_{s \in (S_{min}, S_{max})} \max_{m,n,b,c} L(m, n, q, b, c).$$ (Equation (2))

Similarly, the location and size of the facial region within the image frame may be determined by maximizing the parameters m, n, and s. Directly calculating the maximizers in the above equation is computationally demanding, and may not be a suitable approach for a real-time implementation of the system. However, the logarithm of L($\bullet$), for any fixed values of q and s, can be simplified to a form such that the only computationally expensive operations are three two-dimensional convolutions involving the pixel values y, mean function $\mu$, and variance function $\sigma^2$. These convolutions can be computed very efficiently in terms of the discrete Fourier transform. Once these have been computed, the innermost maximization in Equation (2) amounts to a fast scan through a two-dimensional matrix. Thus the problem above reduces to a one-dimensional search over the quantity s that is repeated twice, once with q=opened and once with q=closed. This can be computed at very high speed with modest computing equipment.

The communication channel may be modeled in a variety of ways including with a Hidden Markov Model (HMM). The facial expressions recognized by the system and the symbols and messages employed by the system, may be selected to suit the needs of individual senders and communication tasks or applications. The structure of and parameters in a communication channel model may be selected uniquely for individual senders or users to correspond to the system characteristics desired by those senders.

A prototype embodiment was developed based on the facial expression of an eye blinking state. The use of other facial expression sequences would be functional—depending on the application and capabilities of the individual sender. In the prototype embodiment of the system, the selected blink signal used to activate a virtual call button, which signal was a sequence of four extended blinks of approximately two seconds each. In the prototype embodiment, the communication channel was modeled using a HMM with five states. The first state represents all non-signaling activities, and the remaining four states represented stages in the signaling process. In an idealized virtual call-button activation for this embodiment, the sender counts to four with the sender's head (with each count corresponding to one (unobservable) state in the HMM), and with each count performs a 2 second blink, which is observed by the system. In practice the duration of blinks varies, and spontaneous blinks may be unintentionally interspersed. In the prototype embodiment of the system, the HMM defines six symbols that may be observed, with five of those symbols corresponding to different length closed-eye periods, and one corresponding to extended periods of open eyes, as shown in Table 1. The model places high probability on observing a blink of duration 1-3 seconds in the signaling states and lower probabilities on blinks of less than 1 second duration and blinks of 3-5 seconds duration in these states. The model places zero probability on blink durations longer than 5 seconds and open-eye periods longer than 5 seconds in duration that occur in the signaling states. The model places high probability on a single blink occurring in each of the intermediate signaling states (before the virtual call-button triggers), but does allow for the possibility of spontaneous blinks during the signaling process. The data collected during a second trial with human subjects was used to set the HMM model parameters with a goal of achieving the lowest practical false-alarm rate while maintaining a true-detection rate greater than 95%. Transition and emissions probabilities are given in Tables 2 and 3.

TABLE 1

Symbols Defined for HMM

| Symbol | Eyelid Behavior |
|---|---|
| 1 | Closed 0-1 seconds |
| 2 | Closed 1-2 seconds |
| 3 | Closed 2-3 seconds |
| 4 | Closed 3-5 seconds |
| 5 | Closed >5 seconds |
| 6 | Open >5 seconds |

TABLE 2

State Transition Probabilities for HMM

| From | To | | | | |
|---|---|---|---|---|---|
| | 1 | 2 | 3 | 4 | 5 |
| 1 | 0.93 | 0.07 | 0 | 0 | 0 |
| 2 | 0 | 0.05 | 0.95 | 0 | 0 |
| 3 | 0 | 0 | 0.05 | 0.95 | 0 |
| 4 | 0 | 0 | 0 | 0.05 | 0.95 |
| 5 | 1.00 | 0 | 0 | 0 | 0 |

TABLE 3

Emission Probabilities for HMM

| State | Symbol | | | | | |
|---|---|---|---|---|---|---|
| | 1 | 2 | 3 | 4 | 5 | 6 |
| 1 | 0.80 | 0.05 | 0.05 | 0.05 | 0.05 | 0.05 |
| 2 | 0.02 | 0.43 | 0.40 | 0.05 | 0 | 0 |
| 3 | 0.02 | 0.43 | 0.40 | 0.05 | 0 | 0 |
| 4 | 0.02 | 0.43 | 0.40 | 0.05 | 0 | 0 |
| 5 | 0.02 | 0.43 | 0.40 | 0.05 | 0 | 0 |

D. Facial Expression Detection

Embodiments of the prototype method for detecting a blink signal, i.e., for an intended activation of the virtual call-button system, follow directly from the eyelid closure detection algorithms and communication channel model described above. The output of those methods or algorithms determines whether the eye is interpreted as being open or closed for each digital video frame that is processed. Each time the eyelid closure state changes (i.e., a sequence from a first facial expression to a second facial expression), the duration of the preceding eye open or eye closed period is computed. All closed-eye periods generate a symbol as do long open-eye periods, as shown in Table 1. A Viterbi decoder may then be used to estimate the maximum likelihood state sequence corresponding to the observed sequence of symbols. Each time the "Trigger Call Bell" state occurs in the maximum likelihood sequence, it is interpreted as an intended activation of the virtual call button.

As noted above, embodiments may employ a variety of electronic hardware. In the above prototype embodiment, the system included two infrared (IR) cameras as digital image sensors, which were paired with IR illuminators. These were operably connected to and in communication with a computer processor having a memory, a non-transient storage, and a USB port as a communication interface. The use of IR sensing allowed the system to function in settings with minimal visible light, such as in a bedroom at night. Cameras were the V120:SLIM™ brand camera model available from NaturalPoint, Inc. (dba OptiTrack), which were selected because of their relatively high frame rate (120 fps), and the capability to synchronize frames that is included in the software libraries from the same vendor. Aluminum t-slot framing was used to construct a frame eight feet wide and six feet high on which cameras and illuminators were mounted, allowing them to be easily repositioned as needed. The framing included an eight foot by six foot base to insure stability, and a foam mat approximately 6 feet square was positioned within the frame to allow participants to lie comfortably with ample space for repositioning.

E. Data Collection Software

For the first two phases of human participant trials with the prototype embodiment, video data were collected for later analysis, but no blink detection processes or algorithms were executed during the tests. A custom data collection application was created using drivers and software libraries provided by the camera vendor to access and synchronize the video streams. The application allowed for easy start and stop data recording, and annotating the recorded video with information including test interval boundaries and blink signal timing.

F. Real-Time Design

For the final phase of human participant tests with the prototype embodiment, blink detection and decoding algorithms were executed in real-time, and an audio signal was generated in real-time to indicate when a blink signal was detected. Initial algorithm development was done in a multi-paradigm computing environment and mathematical programming language, and a custom interface was created to allow the existing algorithms to capture frames from the IR cameras in real-time. The methods described above and initially implemented for non-real-time processing of saved video data were adapted to process the video stream in real-time. This required restructuring of the data flow through the computer program, and optimization of the algorithms for computational efficiency. Several changes were also made in an effort to enhance robustness to factors including large movements on the part of participants, and the possibility of frame loss in the soft-real-time environment. A procedure was also developed and optimized to minimize the time required to perform the enrollment process for each participant. The enrollment procedure collected approximately one minute of digital video from each participant from which images were extracted to train the eye tracking algorithms. Software was developed to allow the test conductor to oversee the training process while minimizing the manual intervention required to generate the needed training images.

G. Control Method Details

The following describes aspects of an embodiment of a blink signal-detection method. This method includes an eye-tracking method or control process, which tracks the location of the eye image in the video frame. The track may be initialized (or reinitialized) by searching the entire video frame, or extended (a much faster process) by searching a smaller region around the last known location. The real-time processing loop also maintains an eye (i.e., facial expression) state, which indicates whether the eye is believed to be open or closed. The timing of changes in the eye state is used to compute the lengths of open- and closed-eye periods. The lengths of open- and closed-eye periods may be used in conjunction with the communication channel model to determine when a blink signal has occurred.

The main prototype process performed or included the following detailed functions or steps in executing methods of the present approach:

1. Reading a frame from the camera library or computer storage.
2. Computing a confidence metric based on a moving-window average of p-values from the eye-open and eye-closed tests made by the tracking algorithm. A small value for this metric indicates that the region currently being tracked matches neither the open-eye template nor the closed-eye template well.
3. Reinitializing track at regular intervals. A longer interval may be used if the confidence metric is above a threshold, and a shorter interval otherwise. This provides robustness to large and/or sudden movements, which may cause the algorithm to lose track of the eye.
4. Extending the eye track (unless it was reinitialized for the current frame in the preceding step).
5. Based on the current eye location identified by the tracking algorithm, performing a statistical test (as described above) to determine whether the eye images in the current frame best match the open or closed template.
6. Testing for eye-state transition, which is indicated by two consecutive frames in which the output of the test in the previous step indicates an eyelid position opposite the current eye state. Update the eye state as appropriate.
7. If an eye-state transition is detected, computing the length of the last eye-open or eye-closed period, and generating a symbol (as defined by the communication-channel model above) if appropriate and adding it to the symbol buffer.
8. If a new symbol is generated in the previous step, running a Viterbi decoder to find the maximum likelihood state sequence corresponding to the observed symbols in the buffer.
9. If the maximum likelihood state sequence includes the state indicating the virtual call button has been activated, playing an alert (e.g., an audio alert) and clearing the symbol buffer.
10. Returning to step 1.

H. Computer Implemented Systems

Figure 10:
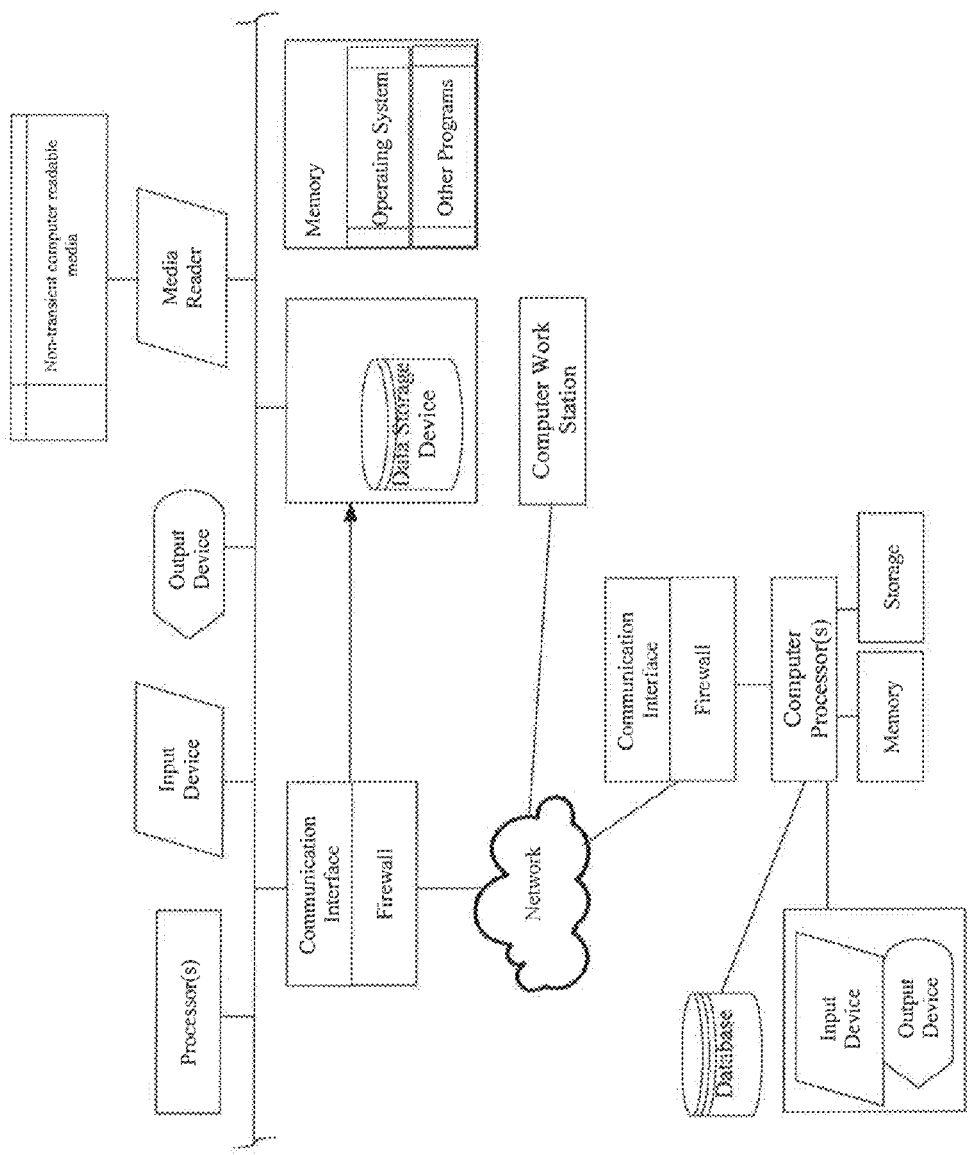
FIG. 10 is a schematic illustration of an aspect of computer implementation of a system embodiment.

As will be appreciated by one of skill in the art, aspects or portions of the present approach may be implemented by a computer-based system, whether as a method, system, or at least in part, on a computer-readable medium. Accordingly, the present approach may take the form of combination of hardware and software embodiments (including firmware, resident software, micro-code, etc.) or an embodiment combining software and hardware aspects that may all generally be referred to herein as a "circuit," "module," or "system." Furthermore, the present approach may take the form of a computer program product on a computer-readable medium having computer program code or instructions embodied in the medium, which may when executed by a computer processor may perform any or all of the above methods. The present approach might also take the form of a combination of such a computer program product with one or more devices, such as an IR camera or modular sensor, systems relating to communications, control, or an integrated remote-control component, etc. In the present system, an IR camera may also symbolically take the form of an Input Device as depicted, for example, in FIG. 10. It is contemplated that such an Input Device will be adapted for the particular application; for example, miniaturized IR cameras may be positioned about the interior of an automobile to capture the input from a driver.

For computer programming support, any suitable non-transient or transitory computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the non-transitory computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a device accessed via a network, such as the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then transitioned to and/or stored in a computer memory. In the context of this document, a computer-usable or computer-readable medium may be any non-transitory medium that can contain, store, communicate, propagate, or transport the program for use by or in connection with the instruction execution system, apparatus, or device.

Computer program code for implementing or carrying out operations of the present system may be written in an object-oriented programming language such as Java, C++, etc. However, the computer program code for carrying out operations of the present approach may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider). A user's computer may include computer tablets, cellular telephones, or other such devices common in broadband computing environments.

The present approach may be described with reference to flowchart illustrations and/or block diagrams of methods, apparatus (systems) and computer program products according to embodiments of the approach. It will be understood that each block of a flowchart illustration and/or block diagram may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Any computer program instructions may also be stored in a non-transient computer-readable memory, including a networked or cloud-accessible memory, that can direct a computer or other programmable data-processing apparatus to function in a particular manner, such that the instructions stored in the computer-readable memory produce an article of manufacture including instruction means which implement the function/act specified in the flowchart and/or block diagram block or blocks.

Any computer program instructions may also be loaded onto a computer or other programmable data-processing apparatus to specially configure it to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

Any prompts associated with the present approach may be presented and responded to via a graphical user interface (GUI) presented on the display of the mobile communications device, a heads up display, a head mounted screen, or the like. Prompts may also be audible, vibrating, etc.

I. Certain Embodiments

Conclusion

1. Certain System Embodiments

Figure 11:
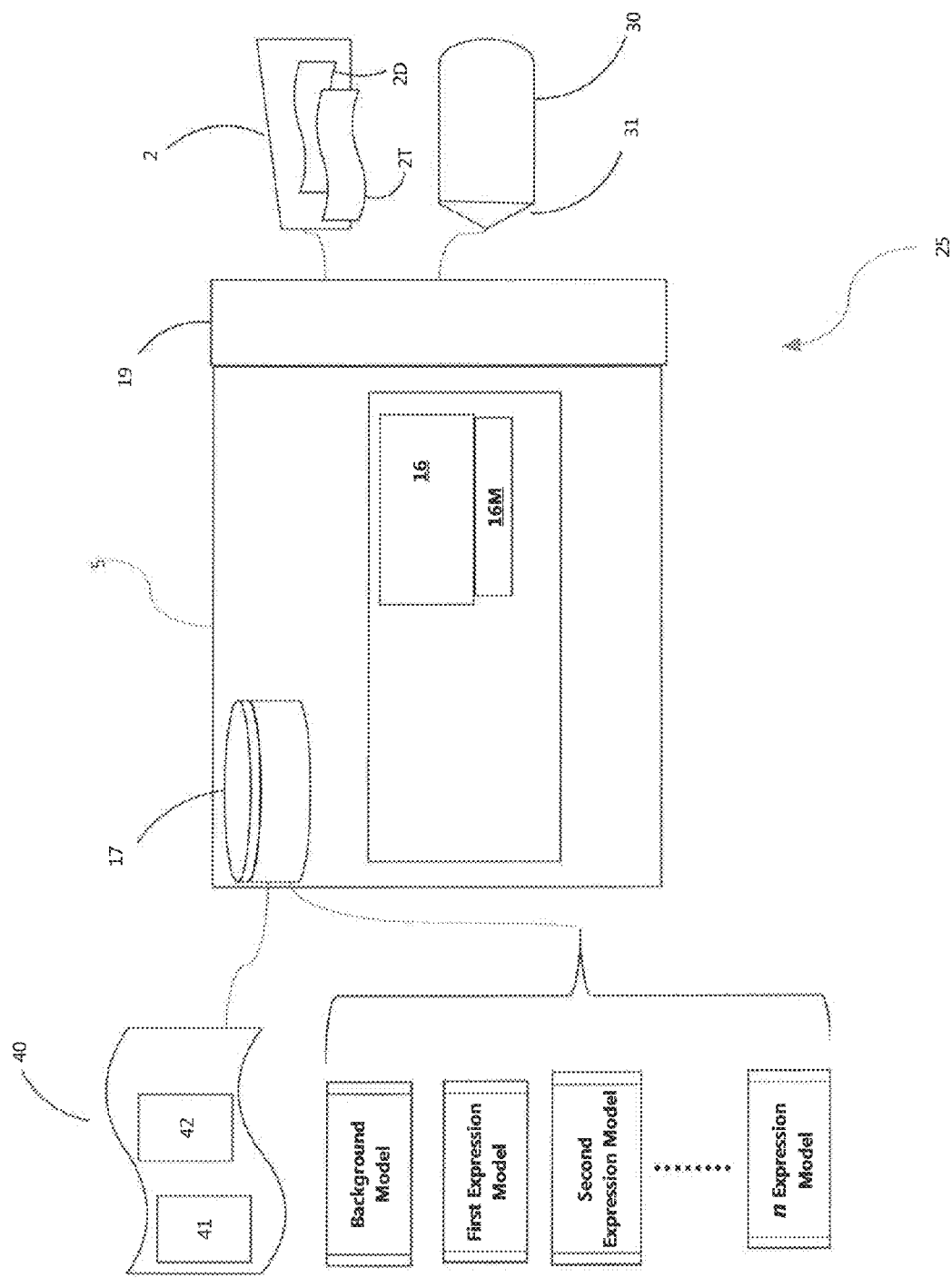
FIG. 11 is an illustration of a system embodiment.

As illustrated in FIG. 11, a system 25 embodiment may enable an individual sender 1 (not shown) to communicate messages to a human or machine receiver 30 by the sender exhibiting a sequence of first and second facial expressions. Such a system 25 may involve at least one stand-off digital image sensing device 2 configured to capture digital images of facial expressions of the sender 1. Stand-off means that the digital image sensors 2 are not worn by the sender 1, operate with other hardware worn by the sender 1, or involve relative constraints. In other words, the system 25 can accommodate movement of the sender 1 within the captured image frames. Optionally, the digital image sensing device 2 may be an infrared camera. The digital image sensing device 2 may include a facial feature detector 2D that locates a sender's face within an image, which can allow the system 25 to detect changes of facial expression from the stand-off location without requiring the sender to wear a facial detection device. The facial feature detector can include a tracker 2T that determines movement of the sender's face from sequences of images, using the background model and the first and second expression models described below.

The at least one image sensing device 2, which may be in operable communication with a digital control unit 5 having at least one computer processor 16, a memory 16M, a non-volatile data storage 17, and a communication interface 19, with the at least one computer processor 16 also in operable communication with memory 16M and data storage 17. A receiver interface 31 may be in communication with the digital control unit 5 also via the communication interface 19. Optionally, portions of the digital control unit 5 functions may be performed by computer systems of the digital image sensing device, for example, or by other distributed physical systems, with the illustration intended to be logical.

The data storage 17 may hold or include a background model, a first expression model, and a second expression model to process the facial expressions within digital images of the sender's facial expression. The background model may be adapted to characterize a plurality of pixels from at least a portion of an image of the sender's face outside a region of interest. The first and second expression models may be adapted to characterize a plurality of pixels within an image of the region of interest of the sender's face when the sender is exhibiting an enrolled first and second facial expression, respectively.

In operation, the first and second expression models characterize the plurality of pixels as a function of location (m, n), orientation ($\phi$, $\theta$, $\psi$), and size(s) of the region of interest within a captured image to accommodate variation in relative stand-off distance and orientation of the at least one digital imaging device to the sender. Also within the data storage, at least one enrolled message may be associated with a sequence of a first and second enrolled expression of the sender.

The digital control unit 5 may include computer programming code 40 having an expression identifier 41 and a sequence decoder 42, so that the at least one computer processor 16 is specially configured by the computer programming code 40 to be adapted to inter-relate with the digital imaging device 2, the background model, and the first and second expression models to locate the facial region of interest of the sender and to capture first and second images of the region of interest of the sender. As noted above, a region of interest for a first expression model may be the set of pixels such that the score function is maximized when the first expression model is applied to those pixels and the background model is applied to all the other pixels. For that same image, the region of interest for a second expression model is the set of pixels such that the score function is maximized when the second expression model is applied to those pixels and the background model is applied to all other pixels. A third score function may be computed with the background model applied to all pixels. Whichever one of these three scores is larger may determine the region of interest (if applying the first or second expression mode gave a larger score) or that there is no region of interest (if applying only the background model gave a larger score). In addition, such computer programming code 40 may be further adapted to perform the steps of: applying the expression identifier 41 to the first and second captured images with the first and second expression models to classify each of the first and second captured images as exhibiting (i) the enrolled first facial expression, (ii) the enrolled second facial expression, or (iii) no enrolled facial expression; and decoding the classified first and second captured images with the sequence decoder 42 based on a matching score to determine if the classified first and second images satisfy a predetermined likelihood of communicating the at least one enrolled message; and communicating the at least one enrolled message to a receiver via the receiver interface.

Optionally, the first and second facial expressions may be unique, and include for example closed eyelids and open eyelids of the sender. The sequence of facial expressions need only be recognizable as such. The at least one message may operate as a virtual button press to activate a system, or to call a person.

In another embodiment, building on the prior embodiment, the system enables an individual sender 1 to communicate messages to a receiver 30 by exhibiting a sequence of first, second, and third facial expression. In such a case, the data storage 17 may also include a third expression model, with the third expression model adapted to characterize a plurality of pixels within an image of the region of interest of the sender's face when the sender is exhibiting an enrolled third facial expression (illustrated as the n expression model, FIG. 11). The third expression model may similarly characterize a plurality of pixels as a function of location (m, n), orientation (φ, θ, ψ), and size(s) of the region of interest within a captured image to accommodate variation in relative stand-off distance and orientation of the at least one digital imaging device to the sender.

In this embodiment, for example, the digital control unit 5 may have computer programming code 40 adapted to inter-relate with the digital imaging device 2, the background model, and the third expression model to locate the facial region of interest of the sender and to capture a third image of the region of interest of the sender. The computer programming code 40 may also be adapted to perform the steps of (a) applying the expression identifier 41 to the third captured image with the first, second, and third expression models to classify each of the first, second, and third captured images as exhibiting (i) the enrolled first facial expression, (ii) the enrolled second facial expression, (iii) the third enrolled facial expression, or (iv) no enrolled facial expression; and (b) decoding the classified first, second, and third captured images with the sequence decoder 42 based on a Hidden Markov Model score to determine if the classified first, second, and third images satisfy a predetermined likelihood of communicating the at least one enrolled message.

Optionally, the expression identifier 41 may classify each of the first and second captured images using a maximum likelihood probability calculation.

In another embodiment, the system 25 enables an individual sender 1 to communicate messages to a receiver by exhibiting a sequence of first and second facial expression or a third and fourth facial expression. The first and third expressions may be the same, and the second and fourth expressions may be the same—but not necessarily. For example, each of the expressions may be unique. For such embodiment, the at least one enrolled message may be a first and a second enrolled message. The first enrolled message could be associated with a sequence of a first and second enrolled expression of the sender; similarly, the second enrolled message could be associated with a sequence of the third and fourth enrolled expressions of the sender. As before, these could reside on the data storage.

The data storage 17 may further include a third expression model, with the third expression model being adapted to characterize a plurality of pixels within an image of the region of interest of the sender's face when the sender is exhibiting an enrolled third facial expression; similarly, the data storage may further comprises a fourth expression model, with the fourth expression model being adapted to characterize a plurality of pixels within an image of the region of interest of the sender's face when the sender 1 is exhibiting an enrolled fourth facial expression. The third and fourth expression models may thus characterize the plurality of pixels as a function of location (m, n), orientation (φ, θ, ψ), and size(s) of the region of interest within a captured image to accommodate variation in relative stand-off distance and orientation of the at least one digital imaging device to the sender. Computer programming code 40 of the digital control unit 5 may be adapted to inter-relate with the digital imaging sensing device 2, the background model, and the third and fourth expression models to locate the facial region of interest of the sender 1 and to capture a third and fourth images of the region of interest of the sender 1.

Further computer programming code 40 may be adapted to perform the steps of (a) applying the expression identifier 41 to the third and fourth captured image with the first, second, third, and fourth expression models to classify each of the first, second, third, and fourth captured images as exhibiting (i) the enrolled first facial expression, (ii) the enrolled second facial expression, (iii) the third enrolled facial expression, (iv) the enrolled fourth facial expression, or (v) no enrolled facial expression, wherein the expression identifier 41 classifies each of the captured images using a maximum likelihood probability calculation; and (b) decoding the classified first, second, third, and fourth captured images with the sequence decoder 42 based on a Hidden Markov Model score to determine if the classified first, second, third, and fourth images satisfy a predetermined likelihood of communicating the first or second enrolled message.

2. Certain Method Embodiments

Figure 12:
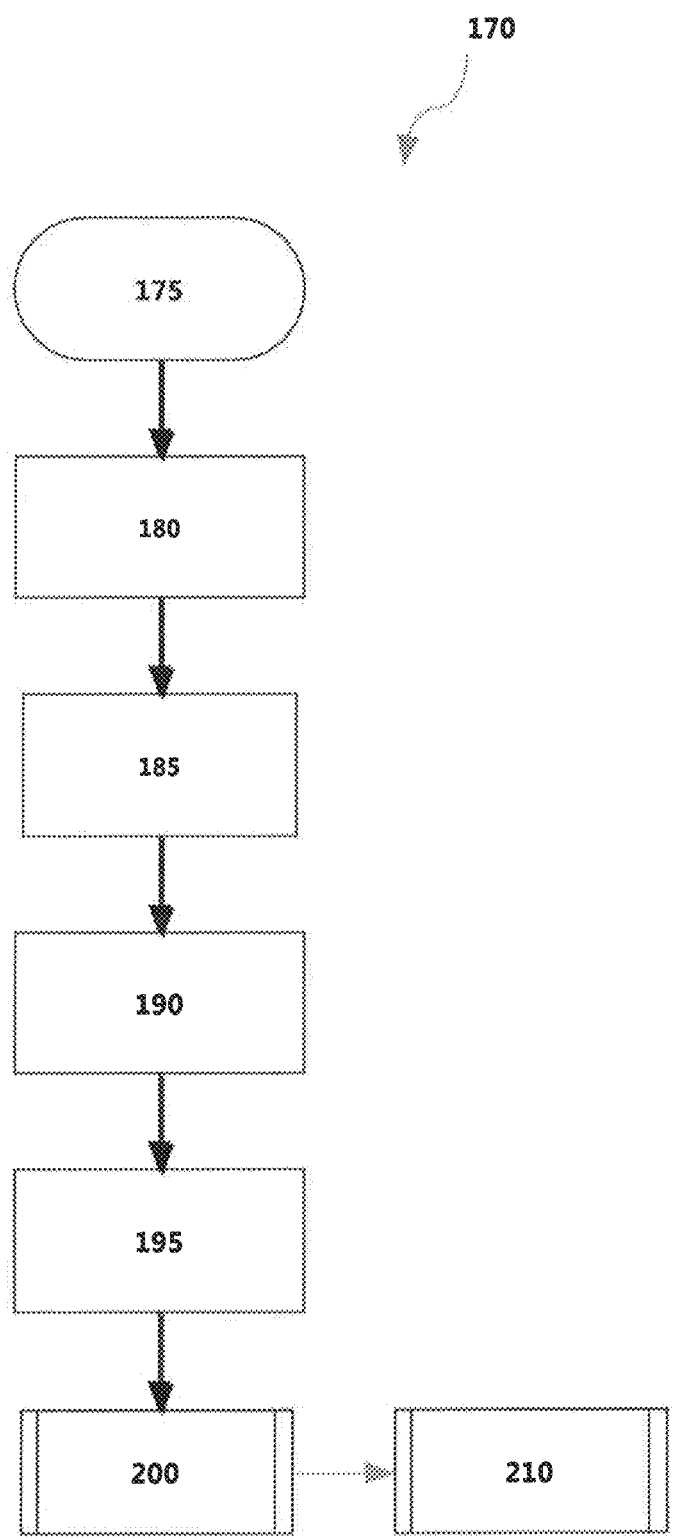
FIG. 12 is an illustration of a method embodiment.

As illustrated in FIG. 12, embodiments of the present approach extend to methods 170 in a computer system for decoding a sequence of a first and a second facial expressions exhibited by an individual sender, in order to determine a message encoded by the individual sender. Such an embodiment may include the steps of receiving 175 with a digital image sensing device first and second enrollment digital images of first and second facial expressions of a sender in sequence, which includes a region of interest of the sender, in order to form enrolled first and second facial expressions. The enrolled first and second facial expressions are associated 180 with at least one enrolled message. Optionally, the digital image sensing device may be an infrared sensor. The implementing computer system or digital image sensing device may include a facial feature detector that locates a sender's face within an image, which can allow the system to detect changes of facial expression from the stand-off location without requiring the sender to wear a facial detection device. The facial feature detector can include a tracker that determines movement of the sender's face from sequences of images, using the background model and the first and second expression models described below.

Another step includes providing a background model 185 and providing an expression model 190 for each unique expression, such as a first expression model and a second expression model, where the background model is adapted to characterizing a plurality of pixels from at least a portion of an image of the sender's face outside a region of interest, the first expression model is adapted to characterizing a plurality of pixels within an image of the region of interest of the sender's face when the sender is exhibiting the enrolled first facial expression, and the second expression model is adapted to characterizing a plurality of pixels within an image of the region of interest of the sender's face when the sender is exhibiting the enrolled second facial expression. The first and second expression models characterize the plurality of pixels as a function of location (m, n), orientation (φ, θ, ψ), and size(s) of the region of interest within a captured image to accommodate variation in relative stand-off distance and orientation of the at least one digital imaging device to the sender.

In this embodiment, other steps involve (a) inter-relating 195 at least one digital image sensing device with the background model and the first and second expression models to locate the facial region of interest of the sender and capturing first and second images of the region of interest of the sender; (b) applying an expression identifier 200 to the first and second captured images with the first and second expression models to classify each of the first and second captured images as exhibiting (i) the enrolled first facial expression, (ii) the enrolled second facial expression, or (iii) no enrolled facial expression; (c) decoding 210 the classified first and second captured images with a sequence decoder based on a matching score to determine if the classified first and second images satisfy a predetermined likelihood of communicating the at least one enrolled message. The imaging, storing, providing, inter-relating, applying, and decoding may be performed on at least one computer processor.

Optionally, the first and second facial expressions of this method may include closed eyelids and open eyelids of the sender. The at least one message may be a virtual button press.

Like variations of the system embodiments, method 175 embodiments may extend to computer systems that decode a sequence of a first, second, and third facial expressions to determine a message encoded by the individual sender. Building on the earlier description, such a method may include further steps of (a) receiving with the at least one digital image sensing device a third enrollment digital image of a third facial expression in sequence with the first and second facial expressions, to form an enrolled third facial expression; (b) providing a third expression model, the third expression model adapted to characterize a plurality of pixels within an image of the region of interest of the sender's face when the sender is exhibiting the enrolled third facial expression; (c) wherein the third expression model may similarly characterize the plurality of pixels as a function of location (m, n), orientation ($\phi$, $\theta$, $\psi$), and size(s) of the region of interest within a captured image to accommodate variation in relative stand-off distance and orientation of the at least one digital imaging device to the sender; (d) inter-relating with a digital imaging sensing device, the background model, and the third expression model to locate the facial region of interest of the sender and to capture a third image of the region of interest of the sender; (e) applying the expression identifier to the third captured image with the first, second, and third expression models to classify each of the first, second, and third captured images as exhibiting (i) the enrolled first facial expression, (ii) the enrolled second facial expression, (iii) the third enrolled facial expression, or (iv) no enrolled facial expression; and (f) decoding the classified first, second, and third captured images with the sequence decoder based on a Hidden Markov Model score to determine if the classified first, second, and third images satisfy a predetermined likelihood of communicating the at least one enrolled message. Optionally, the expression identifier may classify each of the first, second, and third captured images using a maximum likelihood probability calculation.

Like variations of the system embodiments, method embodiments may extend to computer systems that decode a sequence of a first, second facial expressions or a third and fourth facial expression to determine a first or second enrolled message encoded by the individual sender. Such a method may include further the steps of (a) receiving with the at least one digital image sensing device a third and fourth enrollment digital images of a third facial and fourth facial expressions in sequence, with the third and fourth facial expressions to form enrolled third and fourth facial expressions with the second enrolled message associated with the sequence of the enrolled third and fourth facial expressions; (b) providing a third expression model adapted to characterize a plurality of pixels within an image of the region of interest of the sender's face when the sender is exhibiting an enrolled third facial expression; (c) providing a fourth expression model adapted to characterize a plurality of pixels within an image of the region of interest of the sender's face when the sender is exhibiting an enrolled fourth facial expression; (d) wherein the third and fourth expression models characterize the plurality of pixels as a function of location (m, n), orientation ($\phi$, $\theta$, $\psi$), and size(s) of the region of interest within a captured image to accommodate variation in relative stand-off distance and orientation of the at least one digital imaging device to the sender, (e) inter-relating at least one digital imaging sensing device, the background model, and the third and fourth expression models to locate the facial region of interest of the sender and to capture a third and fourth images of the region of interest of the sender; (f) applying the expression identifier to the third and fourth captured image with the first, second, third, and fourth expression models to classify each of the first, second, third, and fourth captured images as exhibiting (i) the enrolled first facial expression, (ii) the enrolled second facial expression, (iii) the enrolled third facial expression, (iv) the enrolled fourth facial expression, or (v) no enrolled facial expression, wherein the expression identifier classifies each of the captured images using a maximum likelihood probability calculation; and (g) decoding the classified first, second, third, and fourth captured images with the sequence decoder based on a Hidden Markov Model score to determine if the classified first, second, third, and fourth images satisfy a predetermined likelihood of communicating the first or second enrolled message.

3. Certain Embodiments of Computer Readable Media

Embodiments of the present approach extend to non-transitory computer-readable medium with instructions stored thereon, such that when the instructions configure and are executed by a processor, they perform steps for decoding a sequence of a first and a second facial expression exhibited by an individual sender to determine a message encoded by the individual sender. As with the method embodiments, the steps may include receiving with a digital image sensing device first and second enrollment digital images of first and second facial expressions of a sender in sequence, which includes a region of interest of the sender, in order to form enrolled first and second facial expressions. The enrolled first and second facial expressions are associated with at least one enrolled message. Optionally, the digital image sensing device may be an infrared sensor. The digital image sensing device may include a facial feature detector that locates a sender's face within an image, which can allow the system to detect changes of facial expression from the stand-off location without requiring the sender to wear a facial detection device. The facial feature detector can include a tracker that determines movement of the sender's face from sequences of images, using the background model and the first and second expression models described below.

Another step includes providing a background model, a first expression model, and a second expression model, where the background model is adapted to characterizing a plurality of pixels from at least a portion of an image of the sender's face outside a region of interest, the first expression model is adapted to characterizing a plurality of pixels within an image of the region of interest of the sender's face when the sender is exhibiting the enrolled first facial expression, and the second expression model is adapted to characterizing a plurality of pixels within an image of the region of interest of the sender's face when the sender is exhibiting the enrolled second facial expression. The first and second expression models characterize the plurality of pixels as a function of location (m, n), orientation ($\phi$, $\theta$, $\psi$), and size(s) of the region of interest within a captured image to accommodate variation in relative stand-off distance and orientation of the at least one digital imaging device to the sender.

In this embodiment, other steps involve (a) inter-relating at least one digital image sensing device with the background model and the first and second expression models to locate the facial region of interest of the sender and capturing first and second images of the region of interest of the sender; (b) applying an expression identifier to the first and second captured images with the first and second expression models to classify each of the first and second captured images as exhibiting (i) the enrolled first facial expression, (ii) the enrolled second facial expression, or (iii) no enrolled facial expression; (c) decoding the classified first and second captured images with a sequence decoder based on a matching score to determine if the classified first and second images satisfy a predetermined likelihood of communicating the at least one enrolled message.

Optionally, the first and second facial expressions may include closed eyelids and open eyelids of the sender. The at least one message may be a virtual button press.

Variations of computer-readable medium embodiments may include instructions that implement all of the variations described in the above method embodiments, including instructions stored thereon when executed by a processor perform the steps of decoding a sequence of a first, second, and third facial expressions to determine a message encoded by the individual sender, or perform steps for decoding a sequence of a first, second facial expressions or a third and fourth facial expression to determine a first or second enrolled message encoded by the individual sender.

Any flowcharts and block diagrams in the figures illustrate the architecture, functionality, and operation of possible implementations of systems, methods and computer program products according to various embodiments of the present approach. In this regard, each block may alternatively represent a module, segment, or portion of code, which comprises one or more executable instructions for implementing the specified logical function(s). It should also be noted that, in some alternative implementations, the functions noted in a block may occur out of the order noted in the figures, or may be optional. In some cases, a block may be provided for contextual detail or completeness, even though, for example, the contents may be trivial from a programming perspective. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed is:

1. A system that enables an individual sender to communicate messages to a receiver by exhibiting a sequence of at least a first and second facial expression, the system comprising:

at least one stand-off digital image sensing device configured to capture digital images of facial expressions of the sender;

a digital control unit having at least one computer processor, memory, non-volatile data storage, and communication interface, such that the at least one computer processor is in operable communication with the memory, data storage, and image sensing device;

a receiver interface in communication with the digital control unit via the communication interface;

the data storage comprising a background model, a first expression model, and a second expression model, the background model adapted to characterize a plurality of pixels from at least a portion of an image outside the region of interest of the sender's face, the first expression model adapted to characterize a plurality of pixels within an image of the region of interest of the sender's face when the sender is exhibiting an enrolled first facial expression, the second expression model adapted to characterize a plurality of pixels within an image of the region of interest of the sender's face when the sender is exhibiting an enrolled second facial expression, wherein the first and second expression models characterize the plurality of pixels as a function of location (m, n), orientation ($\phi$, $\theta$, $\psi$), and size(s) of the region of interest within a captured image to accommodate variation in relative stand-off distance and orientation of the at least one digital imaging device to the sender, the data storage further comprising at least one enrolled message associated with a sequence of a first and second enrolled expressions of the sender;

the digital control unit comprising computer programming code having an expression identifier and a sequence decoder, the at least one computer processor configured by the computer programming code, the computer programming code adapted to inter-relate with the digital imaging device, the background model, and the first and second expression models to locate the facial region of interest of the sender and to capture first and second images of the region of interest of the sender, the computer programming code further adapted to perform the steps of: (a) applying the expression identifier to the first and second captured images with the first and second expression models to classify each of the first and second captured images as exhibiting (i) the enrolled first facial expression, (ii) the enrolled second facial expression, or (iii) no enrolled facial expression; (b) decoding the classified first and second captured images with the sequence decoder based on a matching score to determine if the classified first and second images satisfy a predetermined likelihood of communicating the at least one enrolled message; and (c) communicating the at least one enrolled message to a receiver via the receiver interface.

2. The system of claim 1, wherein the first and second facial expressions comprise closed eyelids and open eyelids of the sender.

3. The system of claim 2, wherein the at least one message is a virtual button press, and the receiver is a person.

4. The system of claim 1, wherein the at least one digital image sensing device comprises an infrared sensor.

5. The system of claim 1, wherein the system further comprises a facial feature detector that locates the sender's face within an image, allowing the system to detect changes of facial expression from a stand-off location without requiring the sender to wear a facial detection device.

6. The system of claim 5, wherein the digital image sensing device includes the facial feature detector, and the facial feature detector includes a tracker that determines movement of the sender's face from sequences of images using the background model and the first and second expression models.

7. The system of claim 1 wherein the system enables an individual sender to communicate messages to a receiver by exhibiting a sequence of first, second, and third facial expressions, wherein:
the data storage further comprises a third expression model, the third expression model adapted to characterize a plurality of pixels within an image of the region of interest of the sender's face when the sender is exhibiting an enrolled third facial expression;
wherein the third expression model characterizes the plurality of pixels as a function of location (m, n), orientation ($\phi$, $\theta$, $\psi$), and size(s) of the region of interest within a captured image to accommodate variation in relative stand-off distance and orientation of the at least one digital imaging device to the sender,
wherein the digital control unit further comprises computer programming code adapted to inter-relate with the digital imaging device, the background model, and the third expression model to locate the facial region of interest of the sender and to capture a third image of the region of interest of the sender, with the computer programming code further adapted to perform the steps of: (a) applying the expression identifier to the third captured image with the first, second, and third expression models to classify each of the first, second, and third captured images as exhibiting (i) the enrolled first facial expression, (ii) the enrolled second facial expression, (iii) the third enrolled facial expression, or (iv) no enrolled facial expression; and (b) decoding the classified first, second, and third captured images with the sequence decoder based on a Hidden Markov Model score to determine if the classified first, second, and third images satisfy a predetermined likelihood of communicating the at least one enrolled message.

8. The system of claim 1, wherein the expression identifier classifies each of the first and second captured images using a maximum likelihood probability calculation.

9. The system of claim 1 wherein the system enables an individual sender to communicate messages to a receiver by exhibiting a sequence of a first and second facial expression or a third and fourth facial expression, wherein:
the at least one enrolled message comprises a first and a second enrolled message, with the first enrolled message associated with a sequence of a first and second enrolled expression of the sender and the second enrolled message associated with a sequence of the third and fourth enrolled expressions of the sender;
the data storage further comprises a third expression model, the third expression model adapted to characterize a plurality of pixels within an image of the region of interest of the sender's face when the sender is exhibiting an enrolled third facial expression;
the data storage further comprises a fourth expression model, the fourth expression model adapted to characterize a plurality of pixels within an image of the region of interest of the sender's face when the sender is exhibiting an enrolled fourth facial expression;
wherein the third and fourth expression models characterize the plurality of pixels as a function of location (m, n), orientation ($\phi$, $\theta$, $\psi$), and size(s) of the region of interest within a captured image to accommodate variation in relative stand-off distance and orientation of the at least one digital imaging device to the sender,
wherein the digital control unit further comprises computer programming code adapted to inter-relate with the digital imaging device, the background model, and the third and fourth expression models to locate the facial region of interest of the sender and to capture a third and fourth images of the region of interest of the sender, with the computer programming code further adapted to perform the steps of: (a) applying the expression identifier to the third and fourth captured image with the first, second, third, and fourth expression models to classify each of the first, second, third, and fourth captured images as exhibiting (i) the enrolled first facial expression, (ii) the enrolled second facial expression, (iii) the third enrolled facial expression, (iv) the enrolled fourth facial expression, or (v) no enrolled facial expression, wherein the expression identifier classifies each of the captured images using a maximum likelihood probability calculation; (b) decoding the classified first, second, third, and fourth captured images with the sequence decoder based on a Hidden Markov Model score to determine if the classified first, second, third, and fourth images satisfy a predetermined likelihood of communicating the first or second enrolled message.

10. A method in a computer system for decoding a sequence of at least a first and a second facial expression exhibited by an individual sender to determine a message encoded by the individual sender, the method comprising:
receiving with a digital image sensing device first and second enrollment digital images of first and second facial expressions of a sender in sequence, including a region of interest of the sender, to form enrolled first and second facial expressions with at least one enrolled message associated with the sequence of the enrolled first and second facial expressions;
providing a background model, a first expression model, and a second expression model, the background model adapted to characterizing a plurality of pixels from at least a portion of an image outside a region of interest of the sender's face, the first expression model adapted to characterizing a plurality of pixels within an image of the region of interest of the sender's face when the sender is exhibiting the enrolled first facial expression, the second expression model adapted to characterizing a plurality of pixels within an image of the region of interest of the sender's face when the sender is exhibiting the enrolled second facial expression,
wherein the first and second expression models characterize the plurality of pixels as a function of location (m, n), orientation ($\phi$, $\theta$, $\psi$), and size(s) of the region of interest within a captured image to accommodate variation in relative stand-off distance and orientation of the at least one digital imaging device to the sender;

inter-relating at least one digital image sensing device with the background model and the first and second expression models to locate the facial region of interest of the sender and capturing first and second images of the region of interest of the sender;

applying an expression identifier to the first and second captured images with the first and second expression models to classify each of the first and second captured images as exhibiting (i) the enrolled first facial expression, (ii) the enrolled second facial expression, or (iii) no enrolled facial expression;

decoding the classified first and second captured images with a sequence decoder based on a matching score to determine if the classified first and second images satisfy a predetermined likelihood of communicating the at least one enrolled message; and wherein the imaging, storing, providing, inter-relating, applying, and decoding are performed on at least one computer processor.

11. The method of claim 10, wherein the at least first and second facial expressions comprise closed eyelids and open eyelids of the sender.

12. The method of claim 11, wherein the at least one message is a virtual button press.

13. The method of claim 10, wherein the at least one digital image sensing device comprises an infrared sensor.

14. The method of claim 10 wherein the computer system decodes a sequence of a first, second, and third facial expression to determine a message encoded by the individual sender, the method further comprising:

receiving with the at least one digital image sensing device a third enrollment digital image of a third facial expression in sequence with the first and second facial expressions, and including the region of interest of the sender, to form an enrolled third facial expression;

providing a third expression model, the third expression model adapted to characterize a plurality of pixels within an image of the region of interest of the sender's face when the sender is exhibiting the enrolled third facial expression;

wherein the third expression model characterizes the plurality of pixels as a function of location (m, n), orientation ($\phi$, $\theta$, $\psi$), and size(s) of the region of interest within a captured image to accommodate variation in relative stand-off distance and orientation of the at least one digital imaging device to the sender;

inter-relating a digital imaging sensing device with the background model and the third expression model to locate the facial region of interest of the sender and to capture a third image of the region of interest of the sender;

applying the expression identifier to the third captured image with the first, second, and third expression models to classify each of the first, second, and third captured images as exhibiting (i) the enrolled first facial expression, (ii) the enrolled second facial expression, (iii) the third enrolled facial expression, or (iv) no enrolled facial expression; and decoding the classified first, second, and third captured images with the sequence decoder based on a Hidden Markov Model score to determine if the classified first, second, and third images satisfy a predetermined likelihood of communicating the at least one enrolled message.

15. The method of claim 14, wherein the expression identifier classifies each of the first, second, and third captured images using a maximum likelihood probability calculation.

16. The method of claim 10 wherein the computer system decodes a sequence of a first, second facial expressions or a third and fourth facial expression to determine a first or second enrolled message encoded by the individual sender, the method further comprising:

receiving with the at least one digital image sensing device a third and fourth enrollment digital images of a third facial and fourth facial expressions in sequence, including the region of interest of the sender, with the third and fourth facial expressions to form enrolled third and fourth facial expressions with the second enrolled message associated with the sequence of the enrolled third and fourth facial expressions providing a third expression model adapted to characterize a plurality of pixels within an image of the region of interest of the sender's face when the sender is exhibiting an enrolled third facial expression;

providing a fourth expression model adapted to characterize a plurality of pixels within an image of the region of interest of the sender's face when the sender is exhibiting an enrolled fourth facial expression;

wherein the third and fourth expression models characterize the plurality of pixels as a function of location (m, n), orientation ($\phi$, $\theta$, $\psi$), and size(s) of the region of interest within a captured image to accommodate variation in relative stand-off distance and orientation of the at least one digital imaging device to the sender, inter-relating at least one digital imaging sensing device with the background model and the third and fourth expression models to locate the facial region of interest of the sender and to capture a third and fourth images of the region of interest of the sender;

applying the expression identifier to the third and fourth captured image with the first, second, third, and fourth expression models to classify each of the first, second, third, and fourth captured images as exhibiting (i) the enrolled first facial expression, (ii) the enrolled second facial expression, (iii) the enrolled third facial expression, (iv) the enrolled fourth facial expression, or (v) no enrolled facial expression, wherein the expression identifier classifies each of the captured images using a maximum likelihood probability calculation; and decoding the classified first, second, third, and fourth captured images with the sequence decoder based on a Hidden Markov Model score to determine if the classified first, second, third, and fourth images satisfy a predetermined likelihood of communicating the first or second enrolled message.

17. A non-transitory computer-readable medium with instructions stored thereon, that when executed by a processor, perform steps for decoding a sequence of at least a first and a second facial expression exhibited by an individual sender to determine a message encoded by the individual sender, the steps comprising:

receiving with a digital image sensing device first and second enrollment digital images of first and second facial expressions of a sender in sequence, including a region of interest of the sender, to form enrolled first and second facial expressions with at least one enrolled message associated with the sequence of the enrolled first and second facial expressions;

providing a background model, a first expression model, and a second expression model, the background model adapted to characterizing a plurality of pixels from at least a portion of an image outside the region of interest of the sender's face, the first expression model adapted to characterizing a plurality of pixels within an image of the region of interest of the sender's face when the sender is exhibiting the enrolled first facial expression, the second expression model adapted to characterizing a plurality of pixels within an image of the region of interest of the sender's face when the sender is exhibiting the enrolled second facial expression, wherein the first and second expression models characterize the plurality of pixels as a function of location (m, n), orientation ($\phi$, $\theta$, $\psi$), and size(s) of the region of interest within a captured image to accommodate variation in relative stand-off distance and orientation of the at least one digital imaging device to the sender, and at least one enrolled message associated with a sequence of a first and second enrolled expressions of the sender;

inter-relating at least one digital image sensing device with the background model and the first and second expression models to locate the facial region of interest of the sender and capturing first and second images of the region of interest of the sender;

applying an expression identifier to the first and second captured images with the first and second expression models to classify each of the first and second captured images as exhibiting (i) the enrolled first facial expression, (ii) the enrolled second facial expression, or (iii) no enrolled facial expression;

decoding the classified first and second captured images with a sequence decoder based on a matching score to determine if the classified first and second images satisfy a predetermined likelihood of communicating the at least one enrolled message.

18. The non-transitory computer-readable medium method of claim 17 wherein the instructions stored thereon, when executed by a processor perform steps for decoding a sequence of at least a first, second, and third facial expressions to determine a message encoded by the individual sender, the steps further comprising:

receiving with the at least one digital image sensing device a third enrollment digital image of a third facial expression in sequence with the first and second facial expressions, and including the region of interest of the sender, to form an enrolled third facial expression;

providing a third expression model, the third expression model adapted to characterize a plurality of pixels within an image of the region of interest of the sender's face when the sender is exhibiting the enrolled third facial expression; wherein the third expression model characterizes the plurality of pixels as a function of location (m, n), orientation ($\phi$, $\theta$, $\psi$), and size(s) of the region of interest within a captured image to accommodate variation in relative stand-off distance and orientation of the at least one digital imaging device to the sender, inter-relating at least one digital imaging sensing device with the background model and the third expression model to locate the facial region of interest of the sender and to capture a third image of the region of interest of the sender:

applying the expression identifier to the third captured image with the first, second, and third expression models to classify each of the first, second, and third captured images as exhibiting (i) the enrolled first facial expression, (ii) the enrolled second facial expression, (iii) the third enrolled facial expression, or (iv) no enrolled facial expression; and decoding the classified first, second, and third captured images with the Viterbi sequence decoder based on a Hidden Markov Model score to determine if the classified first, second, and third images satisfy a predetermined likelihood of communicating the at least one enrolled message.

19. The non-transitory computer-readable medium method of claim 18, wherein the expression identifier classifies each of the first, second, and third captured images using a maximum likelihood probability calculation.

20. The non-transitory computer-readable medium method of claim 17 wherein the instructions stored thereon, when executed by a processor, perform steps for decoding a sequence of a first, second facial expressions or a third and fourth facial expression to determine a first or second enrolled message encoded by the individual sender, the method further comprising:

receiving with the at least one digital image sensing device a third and fourth enrollment digital images of a third facial and fourth facial expressions in sequence, including the region of interest of the sender, with the third and fourth facial expressions to form enrolled third and fourth facial expressions with the second enrolled message associated with the sequence of the enrolled third and fourth facial expressions providing a third expression model adapted to characterize a plurality of pixels within an image of the region of interest of the sender's face when the sender is exhibiting an enrolled third facial expression;

providing a fourth expression model adapted to characterize a plurality of pixels within an image of the region of interest of the sender's face when the sender is exhibiting an enrolled fourth facial expression;

wherein the third and fourth expression models characterize the plurality of pixels as a function of location (m, n), orientation ($\phi$, $\theta$, $\psi$), and size(s) of the region of interest within a captured image to accommodate variation in relative stand-off distance and orientation of the at least one digital imaging device to the sender, inter-relating at least one digital imaging sensing device with the background model and the third and fourth expression models to locate the facial region of interest of the sender and to capture a third and fourth images of the region of interest of the sender;

applying the expression identifier to the third and fourth captured image with the first, second, third, and fourth expression models to classify each of the first, second, third, and fourth captured images as exhibiting (i) the enrolled first facial expression, (ii) the enrolled second facial expression, (iii) the enrolled third facial expression, (iv) the enrolled fourth facial expression, or (v) no enrolled facial expression, wherein the expression identifier classifies each of the captured images using a maximum likelihood probability calculation; and decoding the classified first, second, third, and fourth captured images with the sequence decoder based on a Hidden Markov Model score to determine if the classified first, second, third, and fourth images satisfy a predetermined likelihood of communicating the first or second enrolled message.

* * * * *